United States Patent
Onaka et al.

(10) Patent No.: US 6,717,713 B2
(45) Date of Patent: Apr. 6, 2004

(54) VARIABLE OPTICAL ATTENUATOR WHICH APPLIES A MAGNETIC FIELD TO A FARADAY ELEMENT TO ROTATE THE POLARIZATION OF A LIGHT SIGNAL

(75) Inventors: Hiroshi Onaka, Kawasaki (JP); Nobuhiro Fukushima, Kanagawa (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 10/411,139

(22) Filed: Apr. 11, 2003

(65) Prior Publication Data

US 2003/0210451 A1 Nov. 13, 2003

Related U.S. Application Data

(62) Division of application No. 09/921,692, filed on Aug. 6, 2001, now Pat. No. 6,570,699, which is a continuation of application No. 09/154,278, filed on Sep. 16, 1998, now Pat. No. 6,333,806, which is a continuation of application No. 08/804,517, filed on Feb. 21, 1997, now Pat. No. 5,867,300.

(30) Foreign Application Priority Data

Mar. 1, 1996 (JP) ............................................. 8-045231

(51) Int. Cl.[7] ................................................. G02F 1/09
(52) U.S. Cl. ........................ 359/281; 359/280; 359/283; 324/244.1
(58) Field of Search ............................. 359/281, 283, 359/280, 324, 246, 484, 257, 320; 324/244.1

(56) References Cited

U.S. PATENT DOCUMENTS

| | | | | |
|---|---|---|---|---|
| 3,376,157 A | * | 4/1968 | Guerici et al. | 117/109 |
| 3,407,364 A | * | 10/1968 | Turner | 359/247 |
| 3,411,840 A | * | 11/1968 | Robinson | 359/282 |
| 3,527,577 A | * | 9/1970 | Fan et al. | 423/464 |
| 3,558,214 A | | 1/1971 | DeLong et al. | 359/250 |

(List continued on next page.)

FOREIGN PATENT DOCUMENTS

GB    2 244 595 A    12/1991

(List continued on next page.)

OTHER PUBLICATIONS

Fukada, et al. "Gain–Bandwidth and Noise–Figureue Measuring Technique on an Optical In–Line Amplifer," Technical Report of IEICE, OSC94–69, OPE94–92 (Nov. 1994) (English translation of Abstract only is provided).
Shirasaki et al., Magnetooptical 2×2 switch for single–mode fibers, "Applied Optics," vol. 23, No. 19, Oct. 1984, pp. 3271–3276.

(List continued on next page.)

*Primary Examiner*—Ricky Mack
*Assistant Examiner*—Brandi N Thomas
(74) *Attorney, Agent, or Firm*—Staas & Halsey LLP

(57) ABSTRACT

An apparatus which attenuates a light signal polarized in a first direction. The apparatus includes a polarization rotation unit and an output unit. The polarization rotation unit rotates the polarization of the light signal to produce a polarization rotated light signal having a polarization component in the first direction and a polarization component in a second direction which is substantially 90 degrees with respect to the first direction. The output unit passes, as an output signal, the polarization component in the second direction of the polarization rotated light signal and blocks the polarization component in the first direction. The polarization rotation unit includes an electromagnet and a permanent magnet which apply magnetic fields in specific directions with respect to the light path. Various yoke constructions are provided for the electromagnet and the permanent magnet. A control circuit maintains the output power of the output signal at a constant level, or maintains a constant ratio between the power level of the output signal and the power level of he light signal before the polarization is rotated. The apparatus can have a wavelength dependent attenuation which compensates for the wavelength dependent gain of an optical amplifier.

1 Claim, 29 Drawing Sheets

U.S. PATENT DOCUMENTS

| | | | |
|---|---|---|---|
| 3,700,307 A | 10/1972 | Glenn | 359/497 |
| 4,305,046 A | 12/1981 | Le Floch et al. | 372/106 |
| 4,387,953 A | 6/1983 | Shirasaki et al. | 385/11 |
| 4,436,760 A | 3/1984 | Verhagen et al. | 426/603 |
| 4,548,478 A | 10/1985 | Shirasaki | 359/256 |
| 4,581,579 A | 4/1986 | Nagatsuma et al. | 324/244.1 |
| 4,609,257 A | 9/1986 | Shirasaki | 359/283 |
| 4,637,027 A | 1/1987 | Shirasaki et al. | 372/27 |
| 4,650,289 A | 3/1987 | Kuwahara | 359/494 |
| 4,668,052 A | 5/1987 | Shirasaki | 359/251 |
| 4,678,287 A | 7/1987 | Buhrer | 359/498 |
| 4,818,881 A | 4/1989 | Tanton et al. | 250/338.1 |
| 4,933,629 A | 6/1990 | Kozuka et al. | 324/96 |
| 4,973,120 A | 11/1990 | Jopson et al. | 385/50 |
| 4,984,875 A | 1/1991 | Abe et al. | 324/244.1 |
| 4,988,170 A | 1/1991 | Buhrer | 359/497 |
| 5,029,953 A | 7/1991 | Dexter et al. | 359/352 |
| 5,033,830 A | 7/1991 | Jameson | 359/484 |
| 5,050,968 A | 9/1991 | Ohara | 359/281 |
| 5,052,786 A | 10/1991 | Schulz | 359/484 |
| 5,212,446 A | 5/1993 | Itoh et al. | 324/244.1 |
| 5,225,922 A | 7/1993 | Chraplyvy et al. | 350/124 |
| 5,253,104 A | 10/1993 | Delavaux | 359/341 |
| 5,267,078 A | 11/1993 | Shiraishi et al. | 359/282 |
| 5,345,329 A | 9/1994 | Shirai et al. | 359/282 |
| 5,463,487 A | 10/1995 | Epworth | 359/124 |
| 5,510,926 A | 4/1996 | Bayart et al. | 359/179 |
| 5,521,741 A | 5/1996 | Umezawa et al. | 359/246 |
| 5,526,176 A | 6/1996 | Furukawa | 359/344 |
| 5,528,415 A | 6/1996 | Gauthier et al. | 359/282 |
| 5,555,254 A | 9/1996 | Injeyan et al. | |
| 5,644,145 A | 7/1997 | Ishihara | 250/205 |
| 5,664,131 A | 9/1997 | Sugiya | 359/341 |
| 5,889,609 A | 3/1999 | Fukushima | 359/280 |
| 6,282,016 B1 | 8/2001 | MacCormack et al. | |
| 6,333,806 B1 * | 12/2001 | Onaka et al. | 359/283 |
| 6,570,699 B2 * | 5/2003 | Onaka et al. | 359/281 |

FOREIGN PATENT DOCUMENTS

| | | |
|---|---|---|
| GB | 22-94170 | 4/1996 |
| JP | 56-94326 | 7/1981 |
| JP | 57-68818 | 4/1982 |
| JP | 57-94715 | 6/1982 |
| JP | 57-168221 | 10/1982 |
| JP | 57-188014 | 11/1982 |
| JP | 58-49916 | 3/1983 |
| JP | 59-121313 | 7/1984 |
| JP | 59-121314 | 7/1984 |
| JP | 60-131523 | 7/1985 |
| JP | 60-200225 | 10/1985 |
| JP | 60-203914 | 10/1985 |
| JP | 1-204021 | 11/1985 |
| JP | 60-165933 | 11/1985 |
| JP | 60-165934 | 11/1985 |
| JP | 60-222815 | 11/1985 |
| JP | 60-222818 | 11/1985 |
| JP | 61-97629 | 5/1986 |
| JP | 02-83523 | 3/1990 |
| JP | 2-113019 | 9/1990 |
| JP | 3-206427 | 9/1991 |
| JP | 2-104785 | 1/1992 |
| JP | 5-241209 | 9/1993 |
| JP | 6-51255 | 2/1994 |
| JP | 7-212315 | 8/1995 |

OTHER PUBLICATIONS

N. Fukushima, H. Onaka, M. Shirasaki, Y. Suzuki, T. Tokumasu, Non–Mechanical Variable Attenuator Module Using Faraday Effect, presented at the meeting "Optical Amplifiers and Their Applications", held on Jul. 11–13, 1996, in Monterey, California, sponsored and managed by optical Society of America.

Y. Sugaya, S. Kinoshita, and T. Chikama, *Novel configuration for low–noise and wide–dynamic–range Er–doped fiber amplifier for WDM Systems*, OAA '95 paper FC3, Jun. 16, 1995 (Davos, Switzerland).

Sugaya et al., "Novem configuration for low–noise and wide–dynamic–range ER–doped fiber amplifier for WDM systems,"OAA '95 paper FC3, Jun. 16, 1995, 4 pages.

Japanese Publication "Er: Doped Fiber Amplifier for WDM Transmission Using Fiber Gain Control", Technical Report of IEICE, OCS94–66, OPE94, Nov. 1994, (including English language translation).

T. Kashiwada et al., "Gain–Flattened optical–fiber amplifiers with a hybrid Er–doped–fiber configuration for WDM transmission", OFC '95 Technical Digest, pp. 77–78.

C.R. Giles et al., "Dynamic Gain Equilization in Two–Stage Fiber Amplifiers"; IEEE Photonics Technology Letters, vol. 2, No. 12; Dec. 1990, pp. 866–868.

U.S. patent application Ser. No. 08/789,178, Fukushima, filed Jan. 24, 1997.

U.S. patent application Ser. No. 08/135,557, Fukushima, filed Oct. 14, 1993.

U.S. patent application Ser. No. 08/704,946, Shirasaki et al., filed Aug. 26, 1996.

U.S. patent application Ser. No. 08/674,516, Fukushima, filed Jul. 2, 1996.

U.S. patent application Ser. No. 08/803,378, Fukushima, filed

U.S. patent application Ser. No. 08/859,256, Fukushima, filed May 20, 1997.

U.S. patent application Ser. No. 08/845,847, Sugaya et al., filed Apr. 1997.

U.S. patent application Ser. No. 08/655,027, Sugaya et al., filed May 28,

U.s. patent application Ser. No. 09/921,692, Onaka et al., filed Aug. 6, 2001.

* cited by examiner

FIG. 1
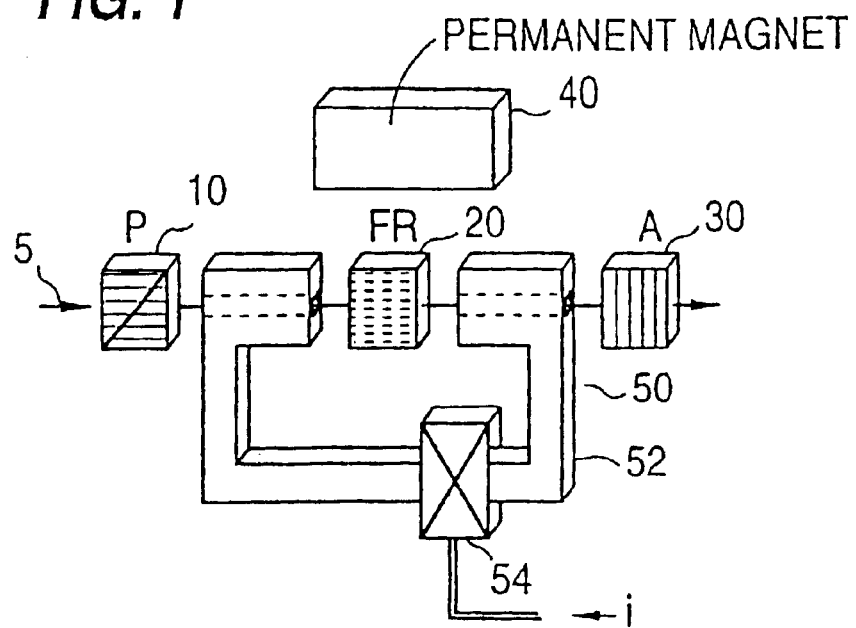
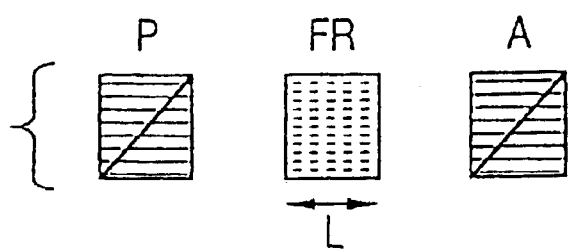
FIG. 2(A)
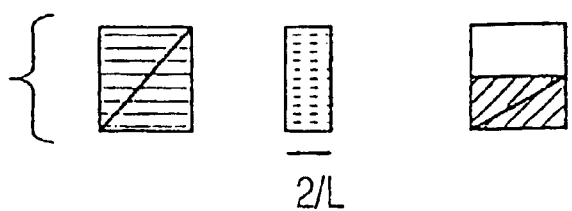
FIG. 2(B)
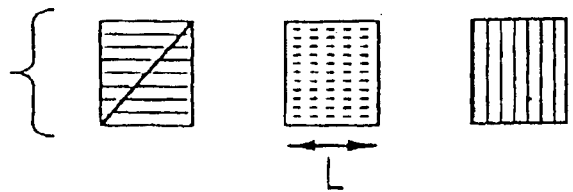
FIG. 2(C)

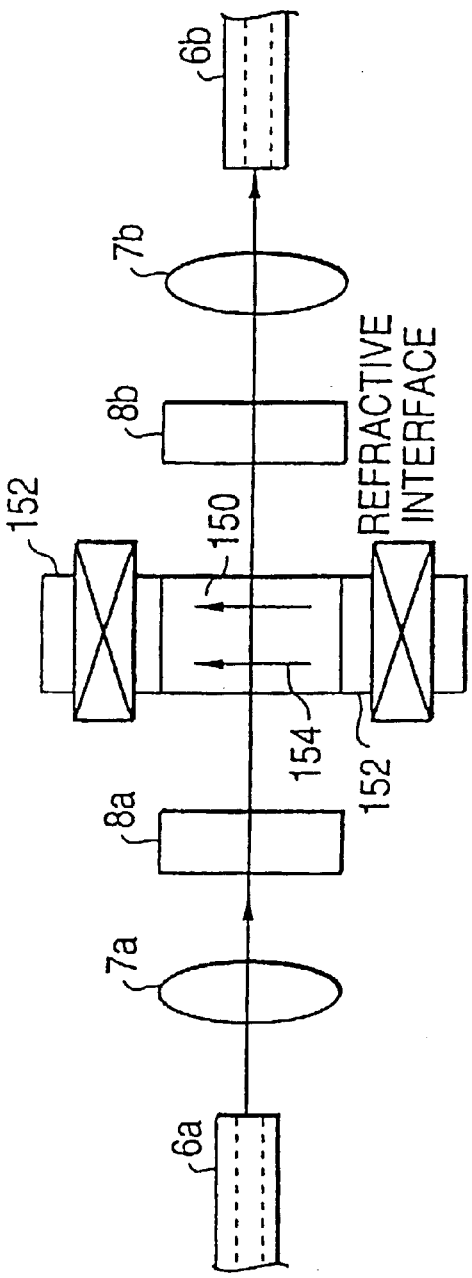
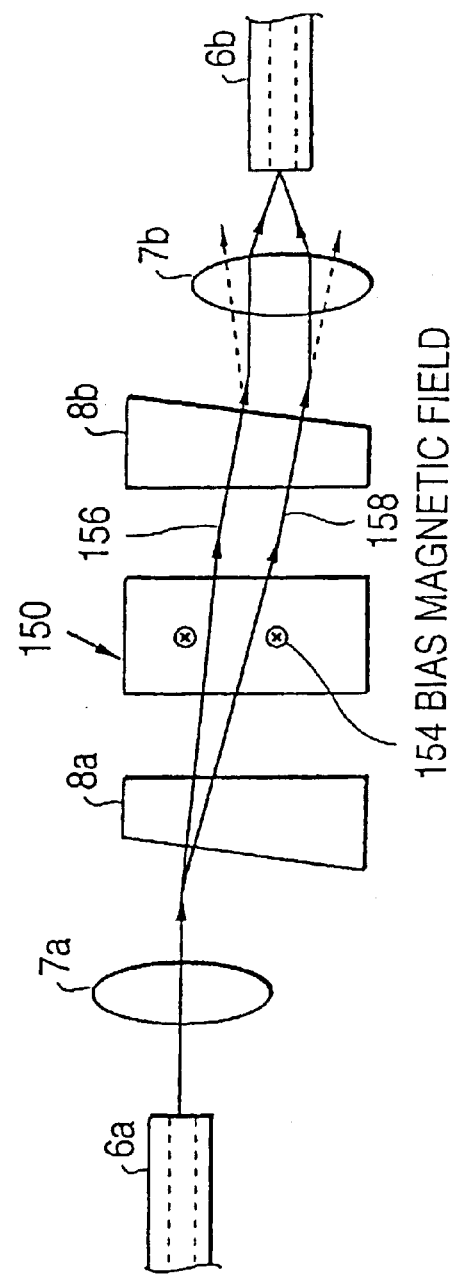
FIG. 26(A)
FIG. 26(B)

| ITEMS | GARNET THICK FILM (-EXAMPLE) | YIG |
|---|---|---|
| WAVELENGTH DEPENDENCE | -0.083 deg/nm | -0.040 deg/nm |
| TEMPERATURE DEPENDENCE | -0.086 deg/nm | -0.042 deg/°C |

FIG. 33

| ARRANGE-MENT OF P AND A | ATTENUATION AT ZERO CURRENT | RELATIONSHIP BETWEEN CURRENT AND ATTENUATION | DIRECTION OF DRIVING CURRENT | RELATIVE DRIVING CURRENT | RELATIVE THICKNESS OF FR ELEMENT | WAVELENGTH-TEMPERATURE DEPENDENCE | DISTINCTION BETWEEN IN-PUT PORT AND OUTPUT PORT |
|---|---|---|---|---|---|---|---|
| 0 DEGREES | MINIMUM ATTENUATION | ATTENUATION INCREASES AS CURRENT IS SUPPLIED | UNIPOLAR | 1 | 1 | LARGE | NO SAME OPERATION |
| 45 DEGREES | 1/2 ATTENUATION | DEPENDS ON POLARITY | BIPOLAR | ±1/2 | 1/2 | MEDIUM | YES COMPEN-SATORY OPERATION |
| 90 DEGREES | MAXIMUM ATTENUATION | ATTENUATION DECREASES AS CURRENT IS SUPPLIED | UNIPOLAR | -1 | 1 | SMALL | NO SAME OPERATION |

VARIABLE OPTICAL ATTENUATOR WHICH APPLIES A MAGNETIC FIELD TO A FARADAY ELEMENT TO ROTATE THE POLARIZATION OF A LIGHT SIGNAL

CROSS-REFERENCE TO RELATED APPLICATIONS

This application is a Divisional of application Ser. No. 09/921,692, filed Aug. 6, 2001, now U.S. Pat. No. 6,570,699, which is a continuation of application Ser. No. 09/154,278, filed Sep. 16, 1998, now U.S. Pat. No. 6,333,806, issued Dec. 25, 2001, which is a continuation of application Ser. No. 08/804,517, filed Feb. 21, 1997, now U.S. Pat. No. 5,867,300, issued Feb. 2, 1999.

This application is based on, and related to, Japanese patent application number 08-45231, filed Mar. 1, 1996, in Japan, and which is incorporated herein by reference.

BACKGROUND OF THE INVENTION

1. Field of the Invention

The present invention relates to variable optical attenuator which attenuates a light signal by rotating the polarization of the light signal as the light signal passes through a Faraday element. More specifically, the present, invention relates to the angle of rotation of the polarization of the light signal, the structure of an electromagnet and permanent magnet used to rotate the polarization of the light signal, and the control of the power level of the light signal and the power level of light output from the variable optical attenuator.

2. Description of the Related Art

FIG. 28 is a diagram illustrating a conventional optical communication system which uses wavelength division multiplexing. Referring now to FIG. 28, a plurality of optical transmitters (OS1 . . . OSn) 200 transmit light signals at corresponding wavelengths ($\lambda 1 \ldots \lambda n$). The light signals are generated from a light source (not illustrated), typically a laser diode (LD), within optical transmitters 200. The light signals transmitted by optical transmitters 200 are combined by a multiplexer (MUX) 210 into a wavelength division multiplexed signal which propagates through an optical fiber 220. An optical amplifier 230 amplifies the wavelength division multiplexed signal. A demultiplexer (DEMUX) 240 demultiplexes the wavelength division multiplexed signal into a plurality of individual light signals at wavelengths $\lambda 1 \ldots \lambda n$. A plurality of optical receivers, or a single tunable optical receiver 250, can be used to detect the individual light signals. An optical frequency controller 260 and an optical frequency standard device 270 can be used to control the transmitting frequencies of optical transmitters 200.

In an optical communications system, it is often required to adjust the intensity (optical power) of light signals. For example, the quality of a signal is determined by the ratio between the intensity of an optical signal and the intensity of noise in the optical signal. This ratio is commonly referred to as the optical signal-to-noise ratio (optical SNR). Therefore, it is often necessary to adjust the intensity of a light signal to increase the optical SNR above a predetermined level.

Moreover, to increase the optical SNR of a wavelength division multiplexed signal in the optical communication system illustrated in FIG. 28, it is usually required for the individual light signals have the same light intensity. However, the level of each light signal undesireably varies according to a variation in the output power of the light source generating the light signal, and according to variations in the insertion loss of optical components in the optical communication system. Also, an optical amplifier typically has a wavelength dependent gain, which thereby causes the various signal lights to have different light intensity.

A variable optical attenuator is typically used to control the intensity of each light signal, and thereby maintain each light signal at the same light intensity. Generally, a variable optical attenuator attenuates, or reduces, the intensity of some of the light signals so that all of the light signals are maintained at the same intensity.

In a conventional optical attenuator, an appropriate substance is attached to a glass substrate so that the light transmissivity varies continuously on the substrate. Attenuation of a light signal is varied by mechanically shifting the position at which the light signal passes through the glass substrate.

However, such mechanical shifting of the position of the light signal results in a relatively slow optical attenuator with an undesireably large size. Thus, it is difficult to provide such a mechanical shifting variable attenuator in an optical transmitter.

Japanese Laid-Open Patent Application No. 6-51255 entitled "OPTICAL ATTENUATOR" discloses a variable optical attenuator which does not require a mechanical shifting operation. FIG. 29 discloses such a variable optical attenuator 9. Referring now to FIG. 29, the variable optical attenuator includes a magnetooptical crystal 1, a polarizer 2, a permanent magnet 3 and an electromagnet 4. A light signal is linearly polarized by a polarizer (not illustrated), to thereby provide a linearly polarized light signal 5. Linearly polarized light signal 5 travels through magnetooptical crystal 1 along a light path. Permanent magnet 3 applies a magnetic field which is parallel to the light path. Electromagnet 4 applies a variable magnetic field which is perpendicular to the light path. The variable magnetic field is controllable by controlling the current provided to electromagnet 4. The magnetic field applied by permanent magnet 3 and the magnetic field applied by electromagnet 4 combine together to form a resulting, or composite, magnetic field which rotates the polarization of linear polarized light signal 5 as it travels along the light path through magnetooptical crystal 1. Magnetooptical crystal 1, permanent magnet 3 and electromagnet 4 together form a Faraday rotator 9.

A large optical loss will occur when magnetooptical crystal 1 has a large number of optical domains. However, if the magnetic field applied by permanent magnet 3 is greater than a saturation level, the*composite magnetic field becomes greater than the saturation magnetic field. In this case, magnetic domains inside magnetooptical crystal 1 are substantially integrated into one large domain, thereby reducing the amount of optical loss.

As the intensity of the magnetic field produced by electromagnet 4 varies in accordance with the level of current in electromagnet 4, the orientation of the composite magnetic field varies in accordance with the level of the current. The polarization direction of light signal 5 is rotated by the composite magnetic field, in accordance with a physical principle referred to as the "Faraday effect". The degree of rotation (that is, the "Faraday rotation") is related to the intensity of the component (magnetization vector) of the composite magnetic field which is parallel to the light path.

The Faraday rotation $\theta$ is given by the following Equation (1).

$$\theta = V \cdot L \cdot H \qquad \text{Equation (1)}$$

where V indicates Verdet's constant determined according to the substance forming magnetooptical crystal 1, L indicates an optical path and H indicates a magnetic field intensity.

Referring again to FIG. 29, light signal 5, having its polarization direction rotated, travels to polarizer 2. If the polarization direction of polarizer 2 coincides with the polarization direction of light beam 5, the entire light beam 5 passes through polarizer 2. If the polarization directions do not coincide, only a component of light beam 5 in alignment with the polarization direction of polarizer 2 passes through polarizer 2. If the polarization directions have a 90 degree displacement with respect to each other, light beam 5 does not pass through polarizer 2, thereby providing maximum attenuation of light beam 5. In this manner, the Faraday rotation θ can be controlled to determine what portion of light beam 5 passes through polarizer 2.

Japanese Laid-Open Patent Application No. 6-51255 also discloses another type of optical attenuator. Such an optical attenuator is illustrated in FIG. 30. Referring now to FIG. 30, a portion of a light signal supplied by an optical fiber 6a is led to an optical fiber 6b by a birefringent effect provided by birefringent crystals 8a and 8b. Lenses 7a and 7b are used to focus the light signal. A Faraday rotator 9, such as the Faraday rotator 9 illustrated in FIG. 29, is between birefringement crystals 8a and 8b. The proportion of the light signal led to optical fiber 6b with respect to the entire light signal can be controlled by adjusting the Faraday rotation provided by Faraday rotator 9. Thus, the power of the light signal can be variably attenuated.

Whereas the variable optical attenuator illustrated in FIG. 29 requires a light beam to be linearly polarized, the variable optical attenuator illustrated in FIG. 30 does not require a light beam to be polarized in any specific direction.

The variable optical attenuators illustrated in FIGS. 29 and 30 do not require any mechanical shifting operation and, therefore, do not have any moving parts. Therefore, such variable optical attenuators provide improved reliability over conventional variable optical attenuators which require parts to be mechanically shifted.

However, with the variable optical attenuator illustrated in FIG. 29, Faraday element 1 is generally a yttrium-iron-garnet (YIG) plate or a garnet thick film that provides a Faraday effect. Unfortunately, the Faraday rotation provided by such a Faraday element generally has a wavelength dependence and a temperature dependence of the rotation.

FIG. 32 lists the wavelength dependence and the temperature dependence of the Faraday rotation provided by the Faraday element, and variations in the Faraday rotation with respect to a variation in the wavelength or the temperature. Measurements are taken of a Faraday rotator that produces a 45-degree Faraday rotation at 1550 nm. The garnet thick film changes its characteristic when its composition is changed. FIG. 32 shows a relatively large change. Negative signs in FIG. 32 indicate that the Faraday rotation decreases as the wavelength or the temperature increases.

FIG. 31 is a graph illustrating a relationship between the magnetic field strength H and the Faraday rotation. Referring now to FIG. 31, as the magnetic field strength H increases, the Faraday rotation increases with a gradient V×L. The Faraday rotation saturates beyond a certain level of the magnetic field strength H. The saturation indicates that the magnetic domains inside the magnetooptical crystal are integrated into one domain. FIG. 31 shows that the gradient V×L changes as the temperature or the wavelength changes. As a result, Verdet's constant has an undesirable wavelength dependence and temperature dependence.

Thus, variable optical attenuators as illustrated in FIGS. 29 and 30 are undesireably dependent on wavelength and temperature. In addition, the variable optical attenuator illustrated in FIG. 30 contains a slight polarization dependent loss.

SUMMARY OF THE INVENTION

Accordingly, it is an object of the present invention to provide a variable optical attenuator which is less dependant on temperature and wavelength.

It is an additional object of the present invention to provide a variable optical attenuator which is relatively compact, requires a relatively small driving current and efficiently applies a magnetic field.

It is a further object of the present invention to provide a variable optical attenuator having a reduced polarization dependent loss.

Additional objects and advantages of the invention will be set forth in part in the description which follows, and, in part, will be obvious from the description, or may be learned by practice of the invention.

The foregoing objects of the present invention are achieved by providing an apparatus which attenuates a light signal polarized in a first direction. The apparatus includes a polarization rotation unit and an output unit. The polarization rotation unit rotates the polarization of the light signal to produce a polarization rotated light signal having a polarization component in the first direction and a polarization component in a second direction which is 80 degrees ±30 degrees with respect to the first direction. The output unit passes the polarization component in the second direction of the polarization rotated light signal and blocks the polarization component in the first direction of the polarization rotated light signal.

Objects of the present invention are also achieved by providing an apparatus which includes a magnetooptical element, a magnetic circuit (such as an electromagnet), and a permanent magnet. A light signal travels through the magnetooptical element along a light path. The magnetic circuit is for applying a variable magnetic field to the magnetooptical element. The permanent magnet is for applying a permanent magnetic field to the magnetooptical element. The variable magnetic field and the permanent magnetic field combine together to form a resulting, or composite, magnetic field which is applied to the magnetooptical element for rotating the polarization of the light signal as the light signal travels through the magnetooptical element. The permanent magnetic field has a component in a direction which is parallel to the light path, so that, when no variable magnetic field is applied to the magnetooptical element by the magnetic circuit, the permanent magnetic field causes the polarization of the light signal to be rotated.

Further, objects of the present invention are achieved by providing an apparatus which includes a magnetooptical element and a magnetic circuit. A light signal travels through the magnetooptical element. The magnetic circuit is for applying a magnetic field to the magnetooptical element to rotate the polarization of the light signal as the light signal travels through the magnetooptical element. The magnetic circuit includes a yoke having first and second ends with a gap between the first and second ends. The magnetic field travels from the first end to the second end of the yoke, with the magnetooptical element positioned in the gap.

Moreover, objects of the present invention are achieved by providing an apparatus which includes a polarization rotation unit, an output unit and a control device. The polarization rotation unit receives a light signal and rotates the polarization of the light signal to produce a polarization rotated light signal. The output unit passes at least a portion of the polarization rotated light signal as an output signal. The control device determines the power level of the output signal and controls the amount of rotation of the polarization rotation unit to maintain the power level of the output signal at a constant value. Alternatively, a control device can be provided which determines the power level of the received light signal and the power level of the output signal and controls the amount of rotation of the polarization rotation unit to maintain a ratio of the power level of the output signal to the power level of the received light signal at a constant value.

Objects of the present invention are also achieved by providing an apparatus which includes an optical amplifier and an optical attenuator. The optical amplifier amplifies a light signal and has a wavelength dependent gain. The optical attenuator attenuates the light signal. The optical attenuator has a wavelength dependent attenuation which opposes the wavelength dependent gain of the optical amplifier.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 1 is a diagram illustrating a variable optical attenuator according to an embodiment of the present invention.

FIG. 2(A) is a diagram illustrating a 0-degree arrangement of a polarizer (P), a Faraday element (FR) and an analyzer (A), wherein the polarization direction of the polarizer is parallel with the polarization direction of the analyzer.

FIG. 2(B) is a diagram illustrating a 45-degree arrangement of a polarizer (P), a Faraday element (FR) and an analyzer (A), wherein the polarization direction of the polarizer is 45 degrees with respect to the polarization direction of the analyzer.

FIG. 2(C) is a diagram illustrating a 90-degree arrangement of a polarizer (P), a Faraday element (FR) and an analyzer (A), wherein the polarization direction of the polarizer is 90 degrees with respect to the polarization direction of the analyzer.

FIGS. 26(A) and 26(B) are a top view and a side view, respectively, of a variable optical attenuator according to a still further embodiment of the present invention.

FIG. 33 is a diagram indicating characteristics of various polarizer/analyzer arrangements, according to an embodiment of the present invention.

DESCRIPTION OF THE PREFERRED EMBODIMENTS

Figure 3:
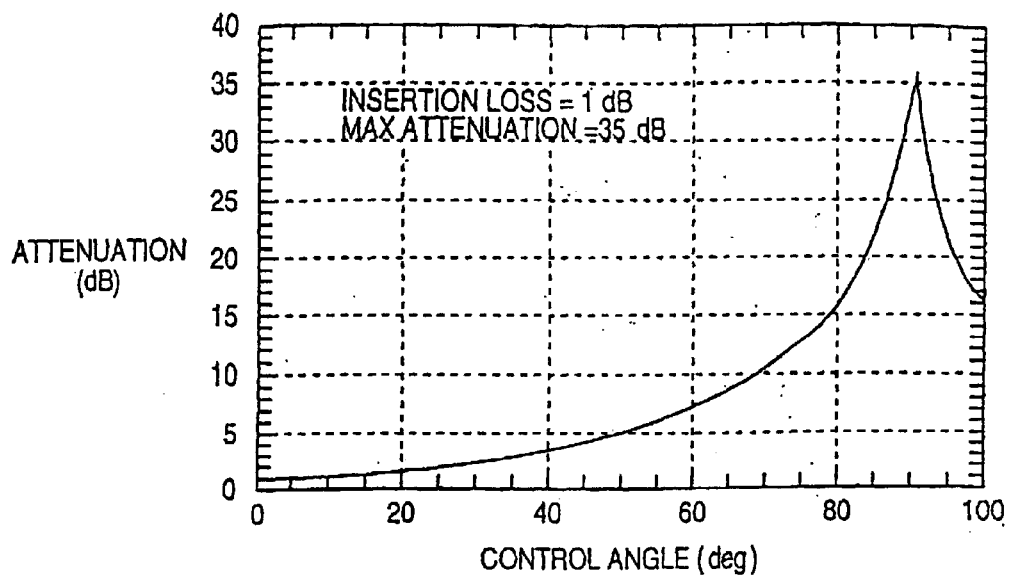
FIG. 3 is a graph illustrating the attenuation with respect to Faraday rotation of a 0-degree arrangement as illustrated in FIG. 2(A).

Reference will now be made in detail to the present preferred embodiments of the present invention, examples of which are illustrated in the accompanying drawings, wherein like reference numerals refer to like elements throughout.

FIG. 1 is a diagram illustrating a variable optical attenuator according to an embodiment of the present invention. Referring now to FIG. 1, the variable optical attenuator includes a polarizer (P) 10, a Faraday element (FR) 20, and an analyzer (A) 30. Faraday element 20 is a magnetooptical element, such as a magnetooptical crystal. A light beam 5 is received by, and polarized by, polarizer 10. The polarized light beam 5 passes through Faraday element 20 and then analyzer 30.

An electromagnet 50 includes a yoke 52 and a coil 54, and applies a variable magnetic field to Faraday element 20. The magnitude of the magnetic field applied by electromagnet 50 can be varied by changing a current "i" applied to coil 54. The variable magnetic field is parallel to the light path of light beam 5 as light beam 5 travels through Faraday element 20.

A permanent magnet 40 applies a magnetic field to Faraday element 20. The magnetic field applied by permanent magnet 40 is perpendicular to the light path of light beam 5 as light beam 5 travels through Faraday element 20.

Polarizer 10 has a corresponding polarization direction. Thus, polarizer 10 linearly polarizes light beam 5 in the polarization direction of polarizer 10. The linearly polarized light beam 5 travels through Faraday element 20, where the polarization direction of the linearly polarized light beam 5 is rotated by Faraday element 20 in accordance a composite magnetic field produced by permanent magnet 40 and electromagnet 50. More specifically, the composite magnetic field has a vector component, or "magnetization vector", which is parallel to the travelling direction of light beam 5 as light beam 5 travels through Faraday element 20. The polarization direction of light beam 5 is rotated in accordance with the intensity of the magnetization vector. Such rotation of a light beam passing through a Faraday element in accordance with an applied magnetic field is referred to as the "Faraday effect". The magnitude of the magnetic field applied by electromagnet 50 and the direction of the composite magnetic field can be varied by changing a current applied to coil 54. Thus, the amount of rotation of the polarization of light beam 5 can be controlled by controlling the current applied to coil 54.

The magnetic field applied by permanent magnet 40 should be large enough to integrate magnetic domains inside Faraday element 20 into a single domain. As a result, the composite magnetic field created by permanent magnet 40 and electromagnet 50 is so large that a loss of light beam 5 inside Faraday element 20 is relatively small.

Analyzer 30 has a corresponding polarization direction, and receives the polarization rotated light beam 5 from Faraday element 20. When the polarization direction of the polarization rotated light beam 5 does not agree with the polarization direction of analyzer 30, a portion or the entirety of light beam 5 is blocked by analyzer 30, to thereby attenuate light beam 5.

Polarizer 10 and analyzer 30 are constructed so that the polarization direction of the linearly polarized light beam 5 as polarized by polarizer 10 is substantially perpendicular to the polarization direction of analyzer 30 when no Faraday rotation is provided by Faraday element 20 (that is, when there is substantially no magnetization vector component in the composite magnetic field applied to Faraday element 20). As a result, it is possible to reduce the temperature dependence and the wavelength dependence of the attenuation provided by the variable optical attenuator.

The perpendicular relationship between the polarization direction of the linearly polarized light beam 5 and the polarization direction of analyzer 30 can also be accomplished by disposing a wavelength plate capable of rotating the polarized light in the optical path, and adjusting the positions of polarizer 10 and analyzer 30. For example, even when there is no angular separation between polarizer 10 and analyzer 30 (that is, even when polarizer 10 and analyzer 30 are in a 0-degree angular arrangement), the required perpendicular arrangement can substantially be accomplished by disposing a wavelength plate and rotating the polarized light by 90 degrees.

A variable optical attenuator is also disclosed in related U.S. patent application titled "FARADAY ROTATOR WHICH GENERATES A UNIFORM MAGNETIC FIELD IN A MAGNETIC OPTICAL ELEMENT", Ser. No. 08/704, 946, filed on Aug. 29, 1996, which is incorporated herein by reference.

Moreover, in the variable attenuator illustrated in FIG. 1 (and also in a variable optical attenuator as disclosed in the above-described related U.S. patent application titled "FARADAY ROTATOR WHICH GENERATES A UNIFORM MAGNETIC FIELD IN A MAGNETIC OPTICAL ELEMENT"), the angular difference between the polarization direction of polarizer 10 and the polarization direction of analyzer 30 can physically be set to any desired value. However, for purpose of description, three angular differences (arrangements) will be discussed below, as examples.

More specifically, FIG. 2(A) is a diagram illustrating a 0-degree arrangement of a polarizer (P), a Faraday element (FR) and an analyzer (A), wherein the polarization direction of the polarizer is parallel with the polarization direction of the analyzer. FIG. 2(B) is a diagram illustrating a 45-degree arrangement of a polarizer (P), a Faraday element (FR) and an analyzer (A), wherein the polarization direction of the polarizer is 45 degrees with respect to the polarization direction of the analyzer. FIG. 2(C) is a diagram illustrating a 90-degree arrangement of a polarizer (P), a Faraday element (FR) and an analyzer (A), wherein the polarization direction of the polarizer is 90 degrees with respect to the polarization direction of the analyzer. The arrangement illustrated in FIG. 2(C) is employed in the variable optical attenuator of the present invention.

An attenuation A provided by the variable optical attenuator is given by the following Equation (2), where θ indicates a relative angle between the polarization direction of the light rotated by the Faraday element and the polarization direction of the analyzer, E indicates an extinction ratio of optical components constituting the variable optical attenuator, and $L_o$ indicates an internal loss of the optical components. Equation (2)

$$A = 10\log(\cos^2(90-\theta+E)) + L_o$$

Referring to Equation (2), above, the attenuation A provided by the variable optical attenuator increases as $\cos^2\theta$ increases.

Figure 4:
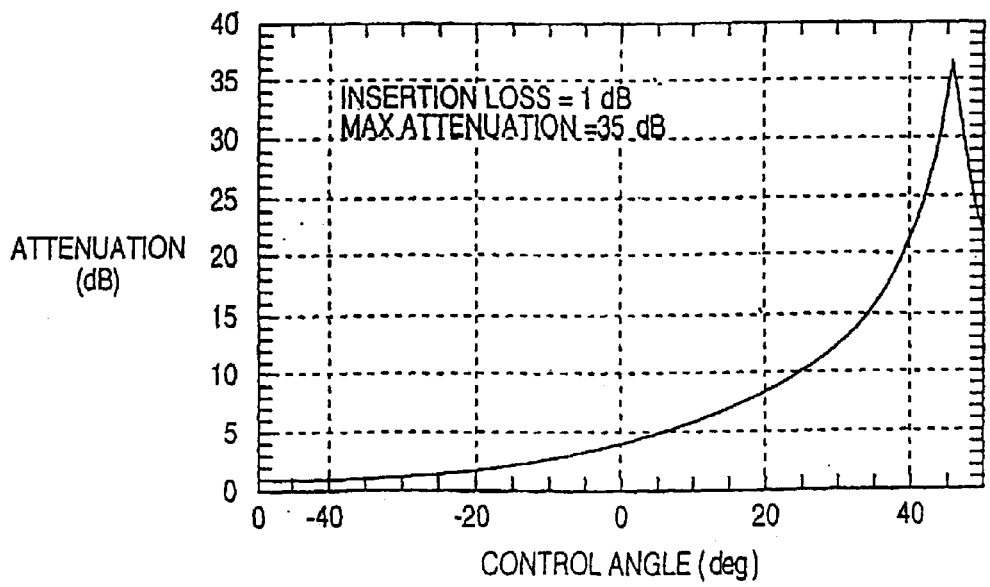
FIG. 4 is a graph illustrating the attenuation with respect to Faraday rotation of a 45-degree arrangement as illustrated in FIG. 2(B).
Figure 5:
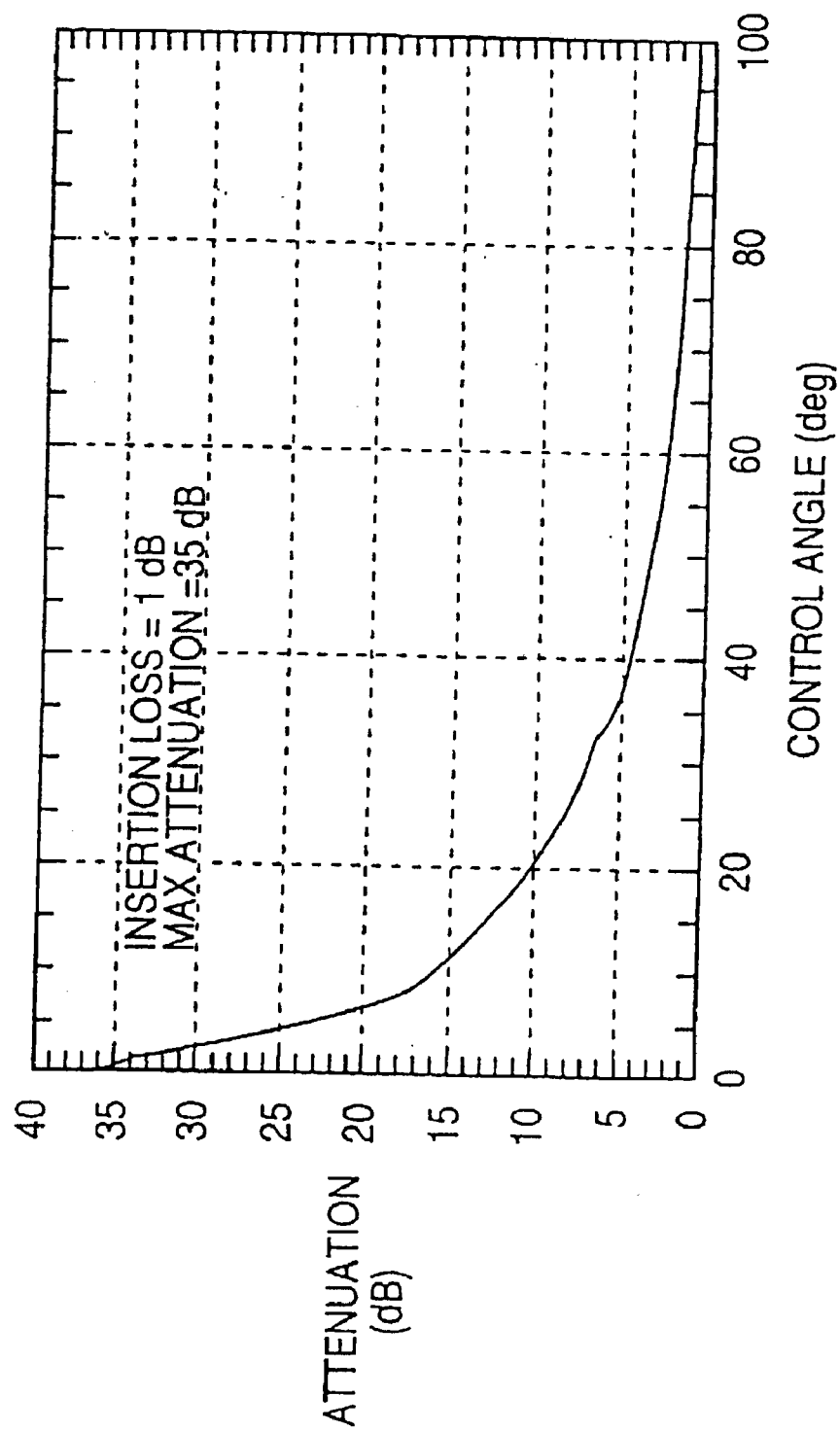
FIG. 5 is a graph illustrating the attenuation with respect to Faraday rotation of a 90-degree arrangement as illustrated in FIG. 2(C).

FIG. 3 is a graph illustrating the attenuation with respect to Faraday rotation of a 0-degree arrangement as illustrated in FIG. 2(A). FIG. 4 is a graph illustrating the attenuation with respect to Faraday rotation of a 45-degree arrangement as illustrated in FIG. 2(B). FIG. 5 is a graph illustrating the attenuation with respect to Faraday rotation of a 90-degree arrangement as illustrated in FIG. 2(C). In FIGS. 3, 4 and 5, the Faraday rotation is referred to as a control angle (deg).

In the 0-degree arrangement illustrated in FIG. 2(A), the attenuation is smallest when the Faraday rotation is 0 degrees (when no magnetic field is applied). As the Faraday rotation increases, the attenuation increases. At a Faraday rotation of 90 degrees, the attenuation is maximum. The attenuation changes gradually as the Faraday rotation approaches 20 degrees, and the attenuation changes radically near the Faraday rotation of 90 degrees. To control the attenuation in a desirable manner, it is required that the length L of the Faraday element be large enough to allow a 90-degree Faraday rotation.

In the 45-degree arrangement illustrated in FIG. 2(B), the attenuation is 3 dB when the Faraday rotation is 0 degrees (when no magnetic field is applied), and the attenuation is minimum when the Faraday rotation is −45 degrees. At the Faraday rotation of +45 degrees, the attenuation is maximum. At a Faraday rotation near 45 degrees, the attenuation varies radically with respect to the Faraday rotation. By applying a reverse current, it is possible to obtain a reverse Faraday rotation. It is required that the length of the Faraday element allow a 45-degree Faraday rotation. Therefore, the length of the Faraday element in the arrangement illustrated in FIG. 2(B) may be half that of the Faraday element of the arrangement illustrated in FIG. 2(A).

In the 90-degree arrangement illustrated in FIG. 2(C), the attenuation is at a maximum when the Faraday rotation is 0 degrees (when no magnetic field is applied). As the Faraday rotation increases, the attenuation decreases such that the attenuation is minimum at the Faraday rotation of 90 degrees. It is to be noted that the attenuation changes radically near the 0-degree Faraday rotation and changes gradually near the 90-degree Faraday rotation. To achieve a desired control, it is required that the length L of the Faraday element be large enough to allow the 90-degree Faraday rotation.

As described above, as the attenuation approaches its maximum level, the attenuation varies radically with respect to a small change in the Faraday rotation.

Applicants have determined that the variation in the Faraday rotation with respect to variation in the wavelength or the temperature depends on the magnitude of the Faraday rotation.

Figure 6:
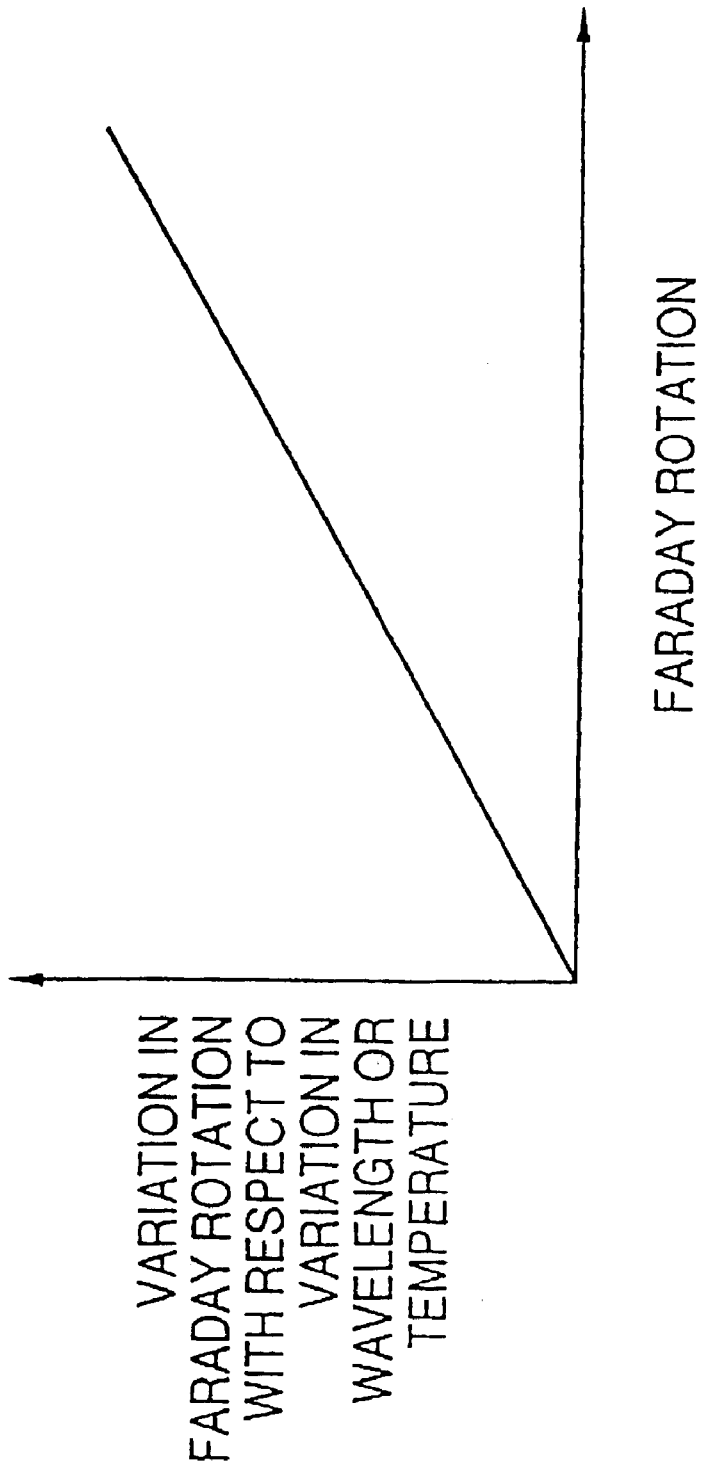
FIG. 6 is a graph illustrating the relationship between a variation in the Faraday rotation with respect to a variation in the wavelength or a variation in the temperature.

More specifically, FIG. 6 is a graph illustrating the relationship between a variation in the Faraday rotation with respect to a variation in the wavelength or a variation in the temperature. Referring now to FIG. 6, the variation of the Faraday rotation is proportional to the magnitude of the Faraday rotation. When the Faraday rotation is 0 degrees (when no magnetic field is applied), the variation in the Faraday rotation with respect to the wavelength or the temperature is 0 degrees. As the Faraday rotation increases, the variation in the Faraday rotation increases.

Therefore, the variation in the Faraday rotation due to the variation in the wavelength or the temperature is minimum when the Faraday rotation does not occur (when the composite magnetic field produced by a permanent magnet and a electromagnet does not have a magnetization component parallel with the light beam). By arranging the polarizer and the analyzer so that a maximum attenuation is obtained in the absence of the Faraday rotation, the variation in the attenuation with respect to the variation in the Faraday rotation becomes small. Accordingly, it is possible to reduce the temperature dependence or the wavelength dependence of the attenuation. In this respect, the 90-degree arrangement illustrated in FIG. 2(C) is desired.

The arrangement illustrated in FIG. 2(C) ensures that the maximum attenuation is obtained at the 0-degree Faraday rotation characterized by a minimum variation in the Faraday rotation due to the variation in the wavelength or the temperature, the attenuation varying radically near the 0-degree Faraday rotation. Also, in accordance with this arrangement, a small attenuation is obtained at a large Faraday rotation characterized by a great variation in the Faraday rotation due to the variation in the wavelength or the temperature, the attenuation varying gradually when the Faraday rotation is large.

More specifically, the polarization directions of the polarizer and the analyzer are set at 90 degrees apart from each other so that the maximum attenuation is obtained at the Faraday rotation of 0 degrees. When the light transmissivity is maximum (that is, when the Faraday rotation is 90 degrees), the Faraday rotation varies greatly due to the variation in the wavelength or the temperature. However, when the light transmissivity is maximum, the attenuation with respect to the Faraday rotation varies only moderately.

FIG. 33 shows characteristics of the 0-degree arrangement, the 45-degree arrangement and the 90-degree arrangement of the polarizer and the analyzer. Referring now to FIG. 33, there is no distinction between an input port and an output port in the 0-degree arrangement and the 90-degree arrangement. In contrast, the 45-degree arrangement is non-reciprocal in that the interchanging of the input side and the output side produces different operations. When no current is applied, this arrangement provides a 3-dB attenuation in both directions. When a light beam is made to pass in one direction without being subject to any attenuation, the light beam input to the other end is subject to a maximum attenuation. In other words, the 45-degree arrangement acts as an isolator.

FIGS. 7 through 11 are graphs illustrating attenuation characteristics with respect to the wavelength. More specifically, FIG. 7(A) is a graph illustrating an arbitrary attenuation with respect to the wavelength when the polarization directions of the polarizer and analyzer are 0 degrees from each other. FIG. 7(B) is a graph illustrating a deviation of an arbitrary attenuation with respect to the wavelength, when the polarization directions of the polarizer and analyzer are 0 degrees from each other. In FIG. 7(B), the deviation is normalized with respect to a wavelength of 1545 nm.

Figure 8A:
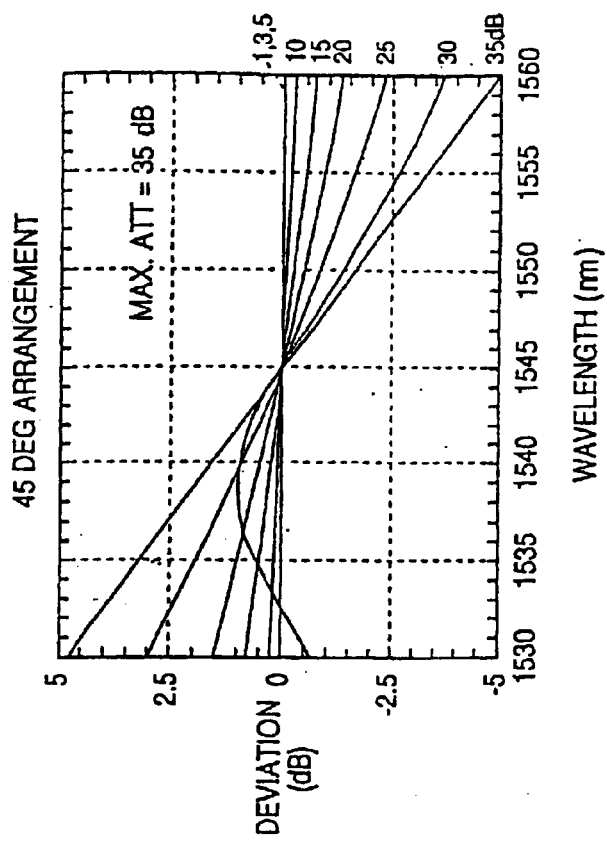
FIG. 8(A) is a graph illustrating an arbitrary attenuation with respect to the wavelength when the polarization directions of the polarizer and analyzer are 45 degrees from each other.
Figure 8B:
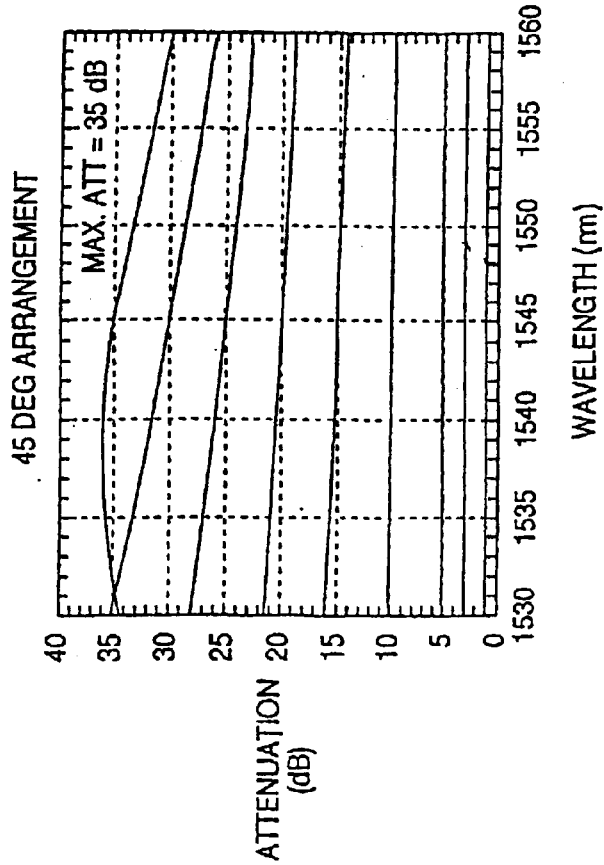
FIG. 8(B) is a graph illustrating a deviation of an arbitrary attenuation with respect to the wavelength, when the polarization directions of the polarizer and analyzer are 45 degrees from each other.

FIG. 8(A) is a graph illustrating an arbitrary attenuation with respect to the wavelength when the polarization directions of the polarizer and analyzer are 45 degrees from each other. FIG. 8(B) is a graph illustrating a deviation of an arbitrary attenuation with respect to the wavelength, when the polarization directions of the polarizer and analyzer are 45 degrees from each other. In FIG. 8(B), the deviation is normalized with respect to a wavelength of 1545 nm.

Figure 9B:
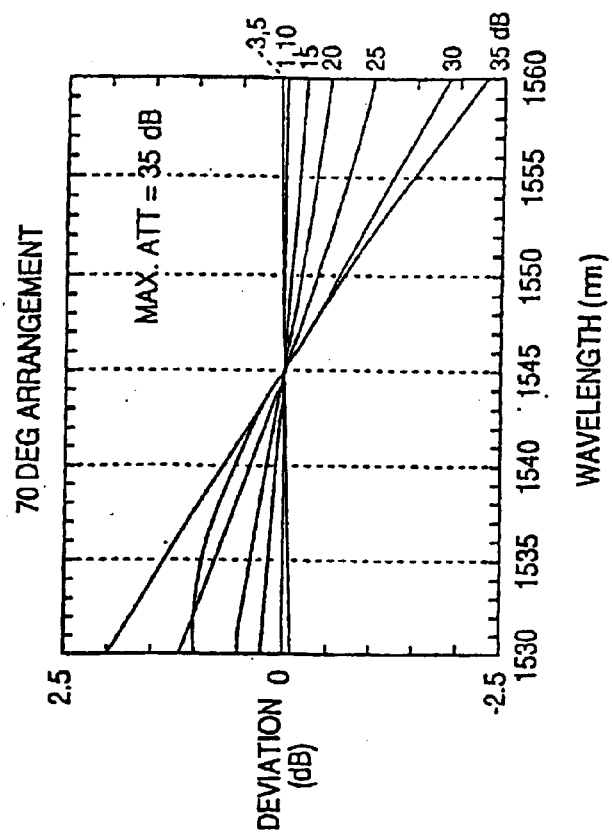
FIG. 9(B) is a graph illustrating a deviation of an arbitrary attenuation with respect to the wavelength, when the polarization directions of the polarizer and analyzer are 70 degrees from each other.
Figure 9A:
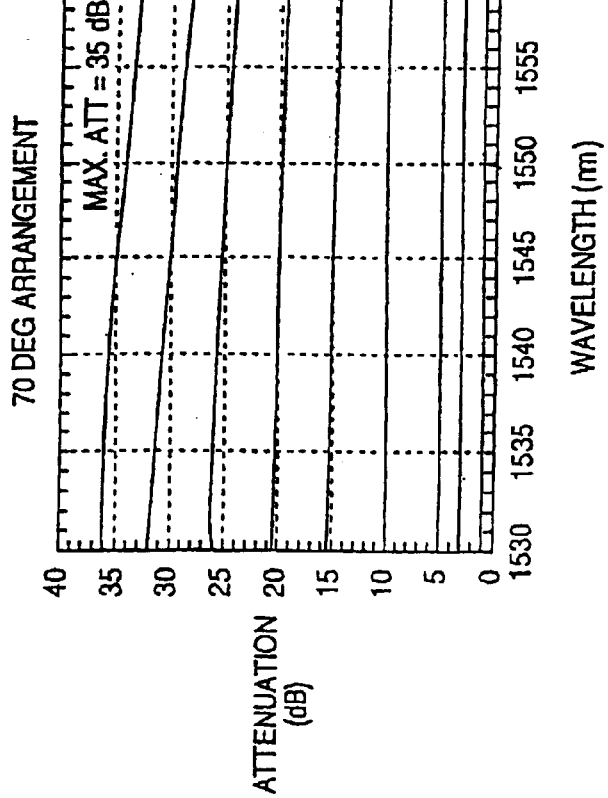
FIG. 9(A) is a graph illustrating an arbitrary attenuation with respect to the wavelength when the polarization directions of the polarizer and analyzer are 70 degrees from each other.

FIG. 9(A) is a graph illustrating an arbitrary attenuation with respect to the wavelength when the polarization directions of the polarizer and analyzer are 70 degrees from each other. FIG. 9(B) is a graph illustrating a deviation of an arbitrary attenuation with respect to the wavelength, when the polarization directions of the polarizer and analyzer are 70 degrees from each other. In FIG. 9(B), the deviation is normalized with respect to a wavelength of 1545 nm.

Figure 10B:
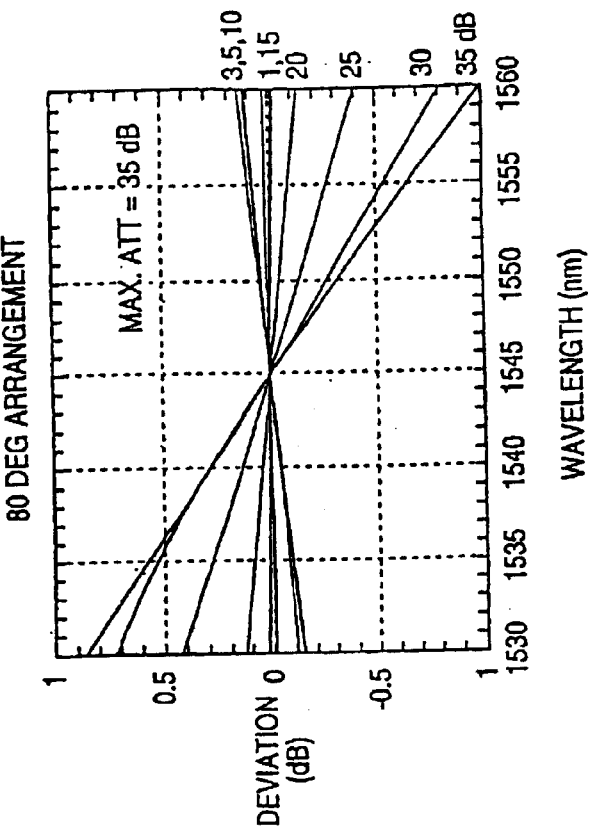
FIG. 10(B) is a graph illustrating a deviation of an arbitrary attenuation with respect to the wavelength, when the polarization directions of the polarizer and analyzer are 80 degrees from each other.
Figure 10A:
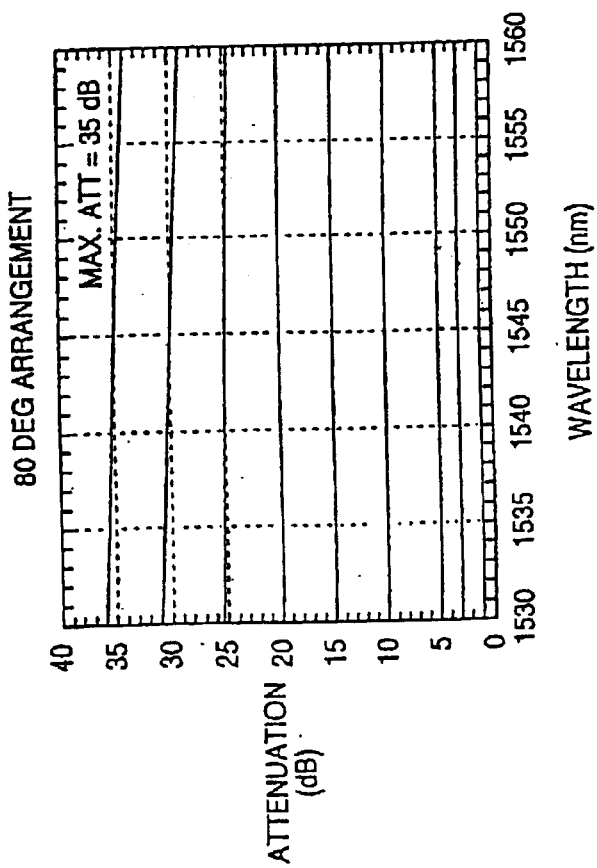
FIG. 10(A) is a graph illustrating an arbitrary attenuation with respect to the wavelength when the polarization directions of the polarizer and analyzer are 80 degrees from each other.

FIG. 10(A) is a graph illustrating an arbitrary attenuation with respect to the wavelength when the polarization directions of the polarizer and analyzer are 80 degrees from each other. FIG. 10(B) is a graph illustrating a deviation of an arbitrary attenuation with respect to the wavelength, when the polarization directions of the polarizer and analyzer are 80 degrees from each other. In FIG. 10(B), the deviation is normalized with respect to a wavelength of 1545 nm.

Figure 11A:
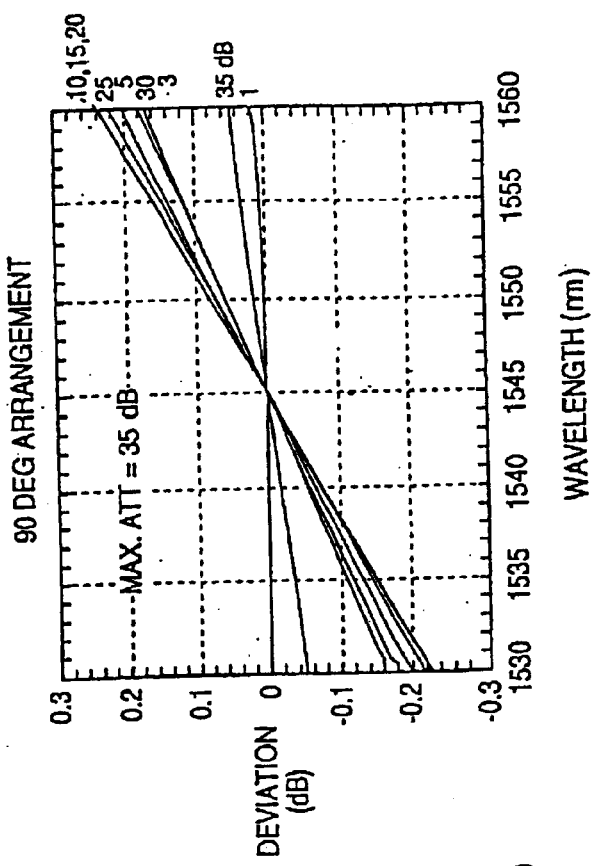
FIG. 11(A) is a graph illustrating an arbitrary attenuation with respect to the wavelength when the polarization directions of the polarizer and analyzer are 90 degrees from each other.
Figure 11B:
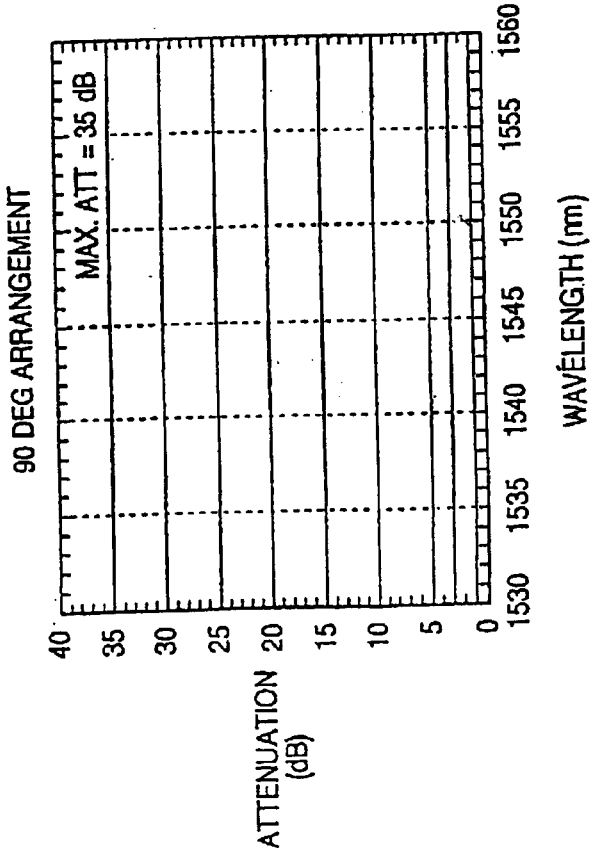
FIG. 11(B) is a graph illustrating a deviation of an arbitrary attenuation with respect to the wavelength, when the polarization directions of the polarizer and analyzer are 90 degrees from each other.

FIG. 11(A) is a graph illustrating an arbitrary attenuation with respect to the wavelength when the polarization directions of the polarizer and analyzer are 90 degrees from each other. FIG. 11(B) is a graph illustrating a deviation of an arbitrary attenuation with respect to the wavelength, when the polarization directions of the polarizer and analyzer are 90 degrees from each other. In FIG. 11(B), the deviation is normalized with respect to a wavelength of 1545 nm.

Figure 7A:
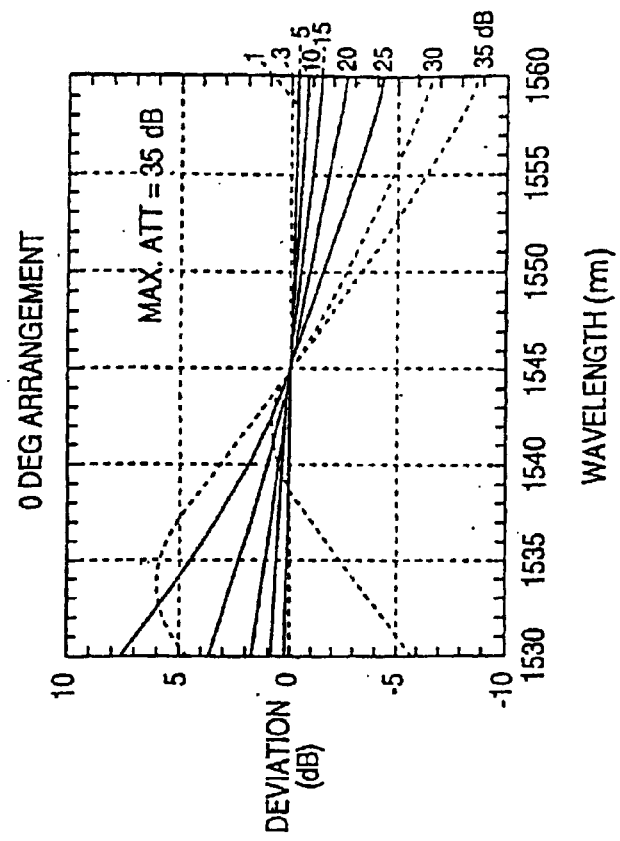
FIG. 7(A) is a graph illustrating an arbitrary attenuation with respect to the wavelength when the polarization directions of the polarizer and analyzer are 0 degrees from each other.
Figure 7B:
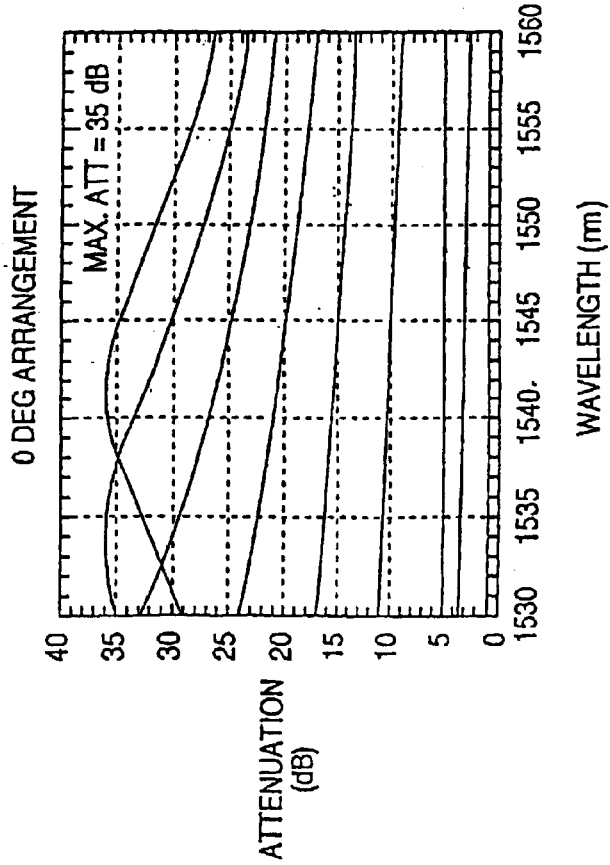
FIG. 7(B) is a graph illustrating a deviation of an arbitrary attenuation with respect to the wavelength, when the polarization directions of the polarizer and analyzer are 0 degrees from each other.

In the 0-degree arrangement having characteristics illustrated in FIGS. 7(A) and 7(B), the attenuation deviates greatly with respect to the wavelength, when the target attenuation is greater than 20 dB. In contrast, according to the 90-degree arrangement illustrated in FIGS. 11(A) and 11(B), only a small deviation in the attenuation occurs with respect to the wavelength, even if the target attenuation is greater than 35 dB. The Faraday rotation is relatively large for the attenuation of 1 dB. For example, the Faraday rotation exhibits a variation of ±2.5 degrees for a ±15 nm variation in the wavelength. However, as illustrated in FIG. 11(B), the deviation in the attenuation is below ±0.01 dB. Therefore, the optical transmission operation is not affected.

When a variable optical attenuator is applied to an optical transmission unit, the attenuation on the order of 0–20 dB is frequently used. Calculation reveals that the deviation of the attenuation on the order of 0–20 dB is smallest in the 80-degree arrangement whose characteristics are illustrated in FIGS. 10(A) and 10(B). Further, considering the conditions in which the optical attenuator is generally used, the wavelength dependence can be reduced to such a level that it presents no substantial problem in practical use, by disposing the polarizer and the analyzer so that their polarization directions are 80±30 degrees apart from each other.

Accordingly, with the variable optical attenuator illustrated in FIG. 1, polarizer 10 and analyzer 30 are disposed such that the polarization direction of light beam 5, as polarized by polarizer 10, is at right angles with the polarization direction of analyzer 30 when Faraday element 20 does not provide a Faraday rotation. However, the polarization direction can be set to differ by 80±30 degrees.

A relationship between the polarization directions of a polarization and an analyzer, as described above, is not limited to the variable optical attenuator illustrated in FIG. 1, and can be applied to variable optical attenuators constructed in a different manner.

Therefore, according to the above embodiments of the present invention, a variable optical attenuator attenuates a light signal polarized in a first direction. The variable optical attenuator includes a permanent magnet, an electromagnet and a Faraday element which together can be referred to as a "polarization rotation unit". The variable attenuator also includes an analyzer which can be referred to as an "output unit". The polarization rotation unit rotates the polarization of the light signal to produce a polarization rotated light signal having a polarization component in the first direction and a polarization component in a second direction which is 80 degrees ±30 degrees with respect to the first direction. The output unit passes the polarization component in the second direction of the polarization rotated light signal and blocks the polarization component in the first direction of the polarization rotated light signal. Such an "output unit" is not intended to be limited to an analyzer, and other devices which pass one polarization component and block other polarization components may be used as an output unit.

Figure 12:
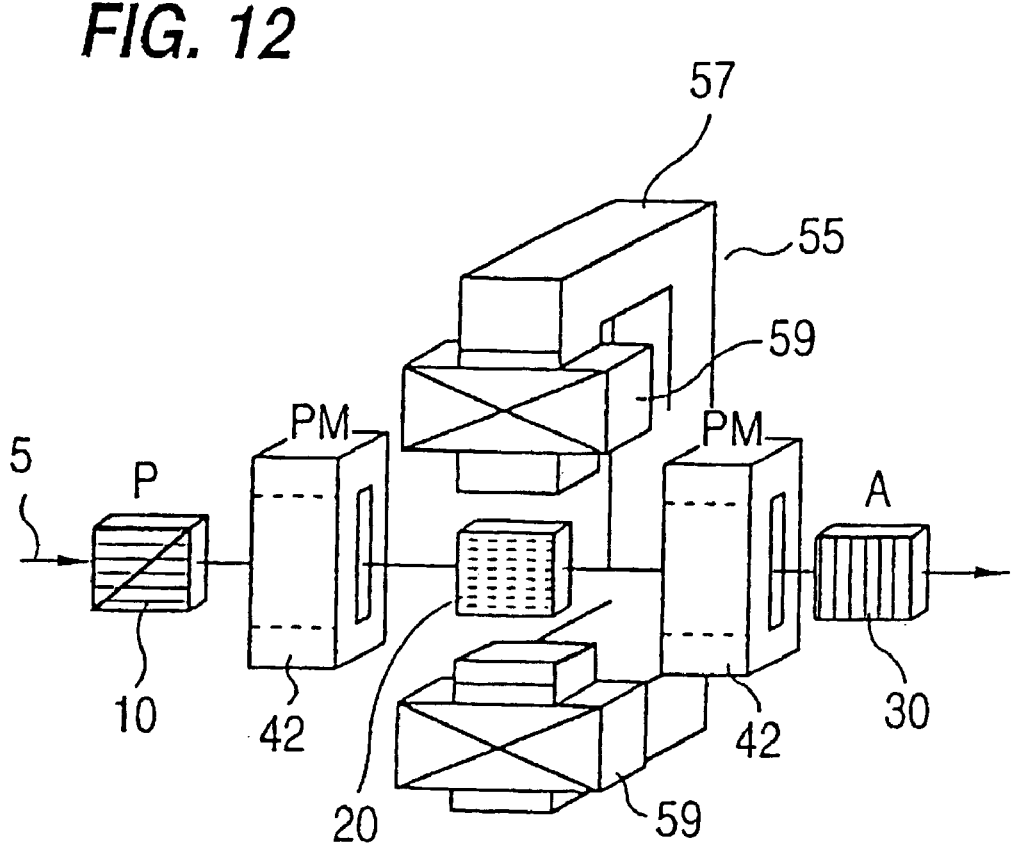
FIG. 12 is a diagram illustrating a variable optical attenuator, according to an embodiment of the present invention.

FIG. 12 is a diagram illustrating a variable optical attenuator, according to an additional embodiment of the present invention. As with the variable optical attenuator illustrated in FIG. 1, the variable optical attenuator illustrated in FIG. 12 includes polarizer 10, Faraday element 20 and analyzer 30. Polarizer 10 and analyzer 30 are disposed such that their polarization directions are substantially perpendicular to each other. Thus, for purpose of description, it is assumed that the polarization directions are 90 degrees apart from each other.

An electromagnet 55 includes a yoke 57 and a coil 59, and applies a magnetic field to Faraday element 20 in a direction perpendicular to the propagation direction, or light path, of light beam 5. A pair of permanent magnets 42 apply a magnetic field to Faraday element 20. Permanent magnets 42 are each doughnut-shaped with holes therein, so that light beam 5 passes through the holes. The magnetic field produced by permanent magnets 42 is applied to Faraday element 20 in a direction parallel with the propagation direction, or light path, of light beam 5.

Thus, polarizer 10 linearly polarizes light beam 5. The linearly polarized light beam 5 passes through Faraday element 20 via the hole of one of permanent magnets 42. As light beam 5 travels through Faraday element 20, the polarization of light beam 5 is rotated in accordance with the composite magnetic field formed by the combination of the magnetic field applied by permanent magnets 42 and the magnetic field applied by electromagnet 55. The polarization rotated light beam 5 is supplied to analyzer 30 via the hole in the other of permanent magnets 42.

The magnetic field produced by permanent magnets 42 is preferably strong enough so that the magnetic domains in Faraday element 20 are integrated. Accordingly, the composite magnetic field produced by permanent magnets 42 and electromagnet 55 is substantially large so that light beam 5 incurs a significantly small loss in the interior of Faraday element 20.

When a current applied to coil 59 is 0 A, only the magnetic field produced by permanent magnets 42 in the propagation direction of light beam 5 is applied to Faraday element 20. In this state, the polarization direction of light beam 5 is significantly rotated according to the principles of Faraday rotation. When the Faraday rotation is 90 degrees, light beam 5 will completely pass through analyzer 30, so that the attenuation of light beam 5 is minimum. When the current supplied to the coil 59 is increased, the magnetization vector (that is, the vector component in the propagation direction of light beam 5) of the composite field is reduced, thereby reducing the amount of Faraday rotation. When the Faraday rotation is substantially 0 degrees (that is, when the composite magnetic field produced by permanent magnets 42 and electromagnet 55 is substantially perpendicular to the propagation direction of light beam 5), light beam 5 will not be rotated and will not pass through analyzer 30, thereby maximizing the attenuation of light beam 5. The relationship between the Faraday rotation and the attenuation of the variable optical attenuator illustrated in FIG. 12 is the same as that illustrated in FIG. 5.

When the Faraday rotation is relatively large, the variation in the Faraday rotation with respect to the variation in the wavelength is also large. However, according to the arrangement illustrated in FIG. 12, the variation in the attenuation with respect to the variation in the Faraday rotation is small, as illustrated in FIG. 5. Accordingly, the variation in the attenuation with respect to the variation in the wavelength is reduced.

When the Faraday rotation is small, the variation in the Faraday rotation with respect to the variation of the wavelength is also small, thus canceling a relatively large variation in the attenuation with respect to the variation in the Faraday rotation. Accordingly, the variation in the attenuation with respect to the variation in the wavelength is reduced.

In the variable optical attenuator illustrated in FIG. 12, it is also possible to reduce the variation in the attenuation with respect to the variation in the temperature. When the variable optical attenuator illustrated in FIG. 12 is applied to an optical transmission unit (that is, an optical transmitter), polarizer 10 and analyzer 30 preferably differ in polarization directions by 80±30 degrees, similar to the case of the variable optical attenuator illustrated in FIG. 1.

Moreover, many types of magnetic circuits can be constructed to have a relationship between polarization directions of a polarizer and an analyzer, as in the above embodiments of the present invention.

A description will now be provided of an additional principle of a variable optical attenuator according to embodiments of the present invention, wherein a variable optical attenuator provides full light transmissivity when a current applied to an electromagnet is 0 A.

The 90-degree arrangement of a polarizer and an analyzer, as described in the above embodiments of the present invention, reduces the wavelength dependence and the temperature dependence of a variable optical attenuator to a substantially small level. In the variable optical attenuator illustrated in FIG. 1, the attenuation of light beam 5 is maximum when the current (driving current) applied to coil 54 of electromagnet 50 is 0 A. Thus, a "fail-safe" function is provided so that the attenuation automatically becomes maximum when the driving current is cut off as a result of a failure in a control circuit or the failure in some other mechanism for supplying a driving current to electromagnet 50.

However, the cutting off of current provided to electromagnet 50 does not allow light beam 5 to be transmitted through the variable attenuator. More specifically, the polarization direction of light beam 5 will not be rotated, and, therefore, light beam 5 will not pass through analyzer 30. As a result, the unexpected cutting off of current provided to electromagnet 50 may cause an undesirable effect on an optical transmission unit or an optical communication system using the variable optical attenuator. Such an undesirable effect may effectively nullify advantages of having a "fail-safe" function.

Figure 13:
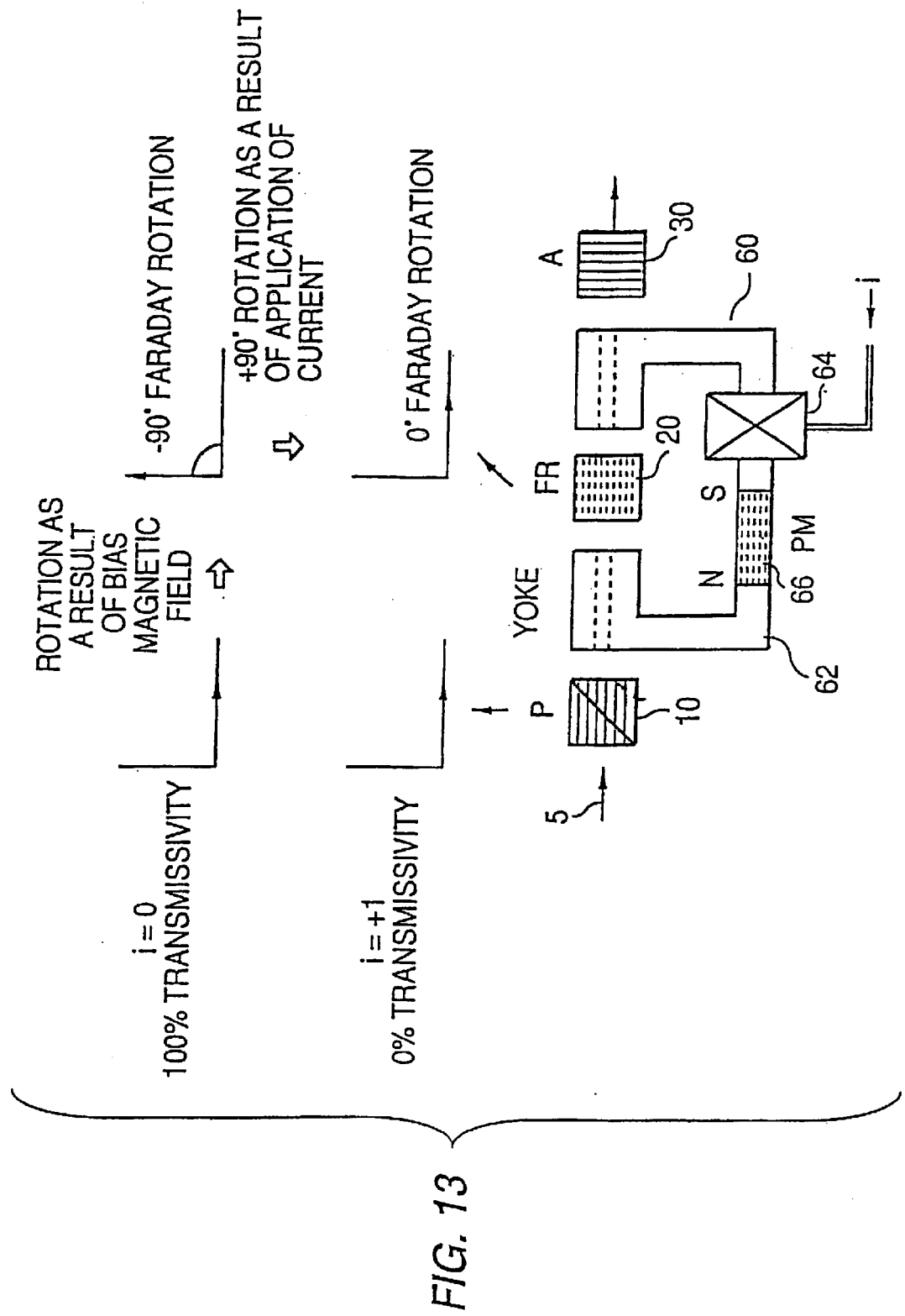
FIG. 13 is a diagram illustrating a variable optical attenuator, according to a further embodiment of the present invention.

FIG. 13 is a diagram illustrating a variable optical attenuator according to a further embodiment of the present invention. The variable optical attenuator illustrated in FIG. 13 is similar to the variable optical attenuator illustrated in FIG. 1, except that the variable optical attenuator illustrated in FIG. 13 includes an electromagnet 60 instead of electromagnet 50 (see FIG. 1). Electromagnet 60 includes a coil 64 and a yoke 62. Yoke 62 has a permanent magnet (PM) 66 built therein. To simplify FIG. 13, permanent magnet 40 (see FIG. 1) is present, but not illustrated in FIG. 13. The remaining aspects of the construction of the variable optical attenuator illustrated in FIG. 13 are the same as the corresponding aspects of the variable optical attenuator illustrated in FIG. 1.

Referring to FIG. 13, polarizer 10 and analyzer 30 are disposed so that the polarization directions thereof are 90 degrees apart from each other. Permanent magnet 66 in electromagnet 60 applies a bias magnetic field in the propagation direction of light beam 5. The strength of the bias magnetic field is set so that the Faraday rotation caused by Faraday element 20 is 90 degrees. The magnetic field of electromagnet 60 produced when a current is applied to coil 64 acts to cancel the bias magnetic field of permanent magnet 66.

When a current applied to coil 64 is 0 A, only the bias magnetic field applied by permanent magnet 66 in the propagation direction of light beam 5 is applied to Faraday element 20. As a result, the polarization direction of light beam 5 is rotated 90 degrees by Faraday element 20. Therefore, the polarization direction of light beam 5 agrees with the polarization direction of analyzer 30 so that the light transmissivity of the variable optical attenuator becomes maximum. When the current applied to coil 64 is increased, the bias magnetic field is canceled so that the Faraday rotation is decreased and the attenuation is increased. Thus, light beam 5 can be transmitted even when no current is supplied to electromagnet 60, and the wavelength dependence and the temperature dependence can be reduced.

Figure 14:
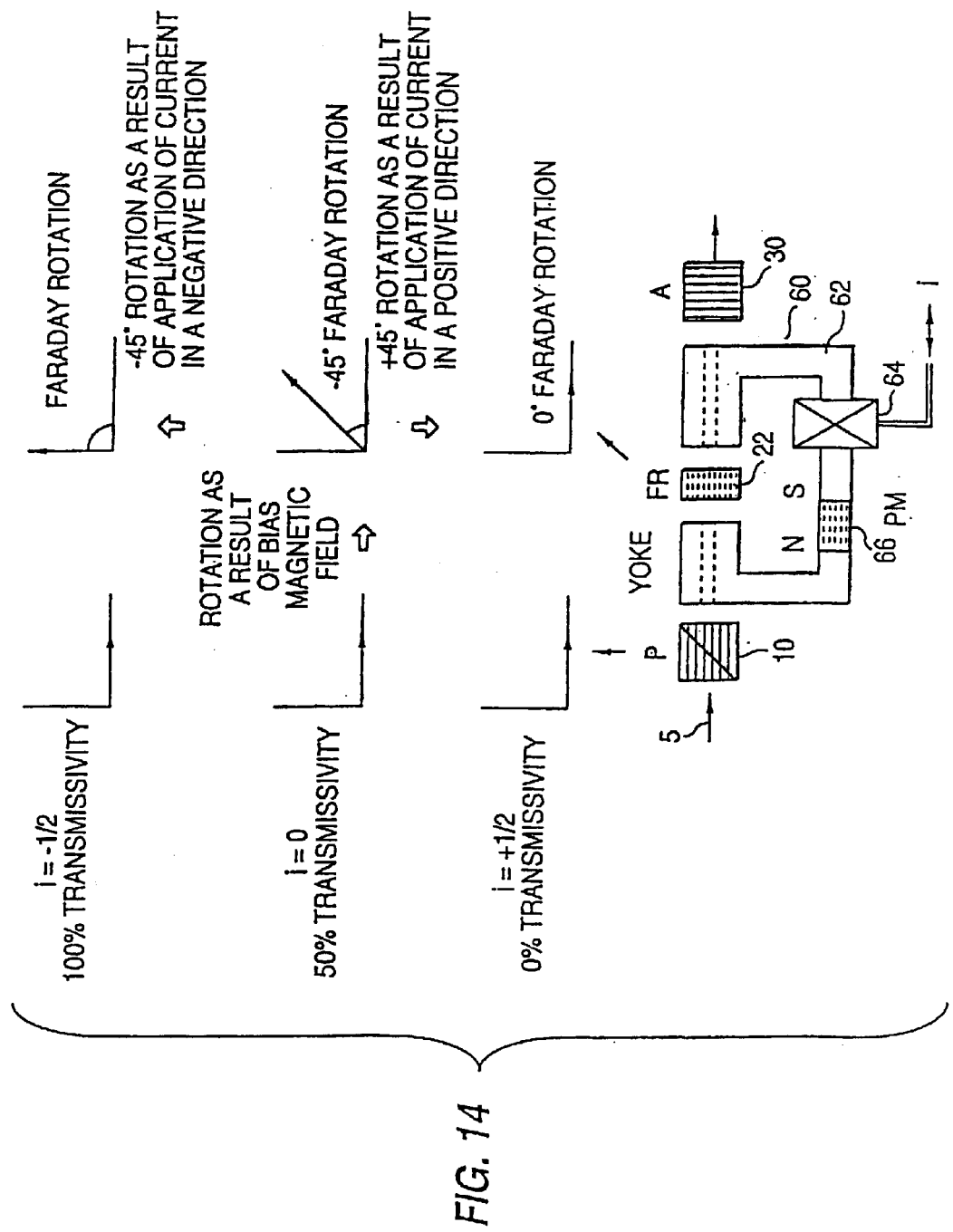
FIG. 14 is a diagram illustrating a modification to the variable optical attenuator illustrated in FIG. 13, according to an embodiment of the present invention.

FIG. 14 is a diagram illustrating a modification to the variable optical attenuator illustrated in FIG. 13, according to an embodiment of the present invention. Referring now to FIG. 14, a Faraday element 22 is approximately half as long as Faraday element 20 provided in earlier described embodiments of the present invention (for example, see Faraday element 20 in FIG. 1). The length of Faraday element 22 is set so that the bias magnetic field produced by permanent magnet 66 in electromagnet 60 provides a −45 degree Faraday rotation. Polarizer 10 and analyzer 30 are disposed so that the polarization directions thereof are 90 degrees apart from each other. The remaining aspects of the construction of the variable optical attenuator illustrated in FIG. 14 are the same as the corresponding aspects of the variable optical attenuator illustrated in FIG. 13.

Referring to FIG. 14, when no current is applied to electromagnet 60, only the bias magnetic field produced by permanent magnet 66 is applied to Faraday element 22 so that a −45 degree Faraday rotation occurs. In this case, the light transmissivity is approximately 50%.

When a current is provided to electromagnet 60 in a forward direction, the strength of the bias magnetic field is decreased due to the magnetic field produce by electromagnet 60, thus causing the Faraday rotation to be reduced. When the Faraday rotation is 0 degrees, the attenuation is maximum.

When a current is applied to electromagnet 60 in a negative direction, the magnetic field produced by the electromagnet 60 is superimposed on the bias magnetic field so that the Faraday rotation is increased in a negative direction. When the Faraday rotation reaches −90 degrees, the light transmissivity becomes maximum.

When no current is applied to electromagnet 60 as a result of, for example, a failure, 50% of light beam 5 can be transmitted through analyzer 30. The wavelength dependence and the temperature dependence are also reduced. Since a Faraday rotation of 45 degrees ensures the maximum light transmissivity, the power to be supplied to electromagnet can be relatively small. Thus, the variable optical attenuator illustrated in FIG. 14 has a low power consumption.

In the variable optical attenuators illustrated in FIGS. 13 and 14, a permanent magnet is embedded in a yoke of an electromagnet. However, the permeability of the substance forming the yoke is significantly high so that positioning the permanent magnet close to the yoke achieves the same effect as achieved by embedding the permanent magnet in the yoke.

Figure 15:
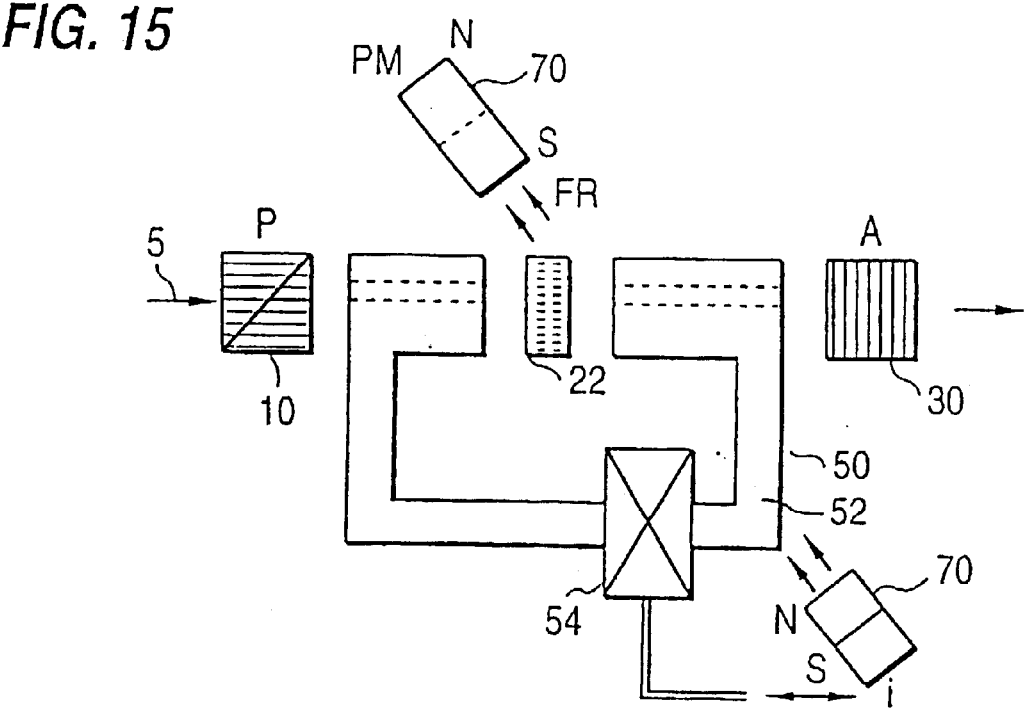
FIG. 15 is a diagram illustrating a modification to the variable optical attenuator illustrated in FIG. 14, according to an embodiment of the present invention.

FIG. 15 is a diagram illustrating a modification to the variable optical attenuator illustrated in FIG. 14, according to an embodiment of the present invention. The optical variable attenuator illustrated in FIG. 15 differs from the variable optical attenuator illustrated in FIG. 14 in that electromagnet 50 (which does not include a permanent magnet therein) is provided instead of electromagnet 60, and a pair of permanent magnets 70 are provided for applying a bias magnetic field to the Faraday element 20 in an oblique direction with respect to the light path of light beam 5.

In the variable optical attenuator illustrated in FIG. 14, the bias magnet produced by permanent magnet 66 provided in yoke 62 is applied in the propagation direction of light beam 5. However, in order to integrate the magnetic domains in Faraday element 22, a bias magnetic field may be applied in a direction perpendicular to the propagation direction of light beam 5 by using a separate permanent magnet (as in the variable optical attenuator illustrated in FIG. 1). In this case, Faraday element 22 is subject to the composite magnetic field comprising the totality of the bias magnetic fields. In the variable optical attenuator illustrated in FIG. 15, the composite magnetic field can be formed solely by permanent magnets 70.

Accordingly, the variable optical attenuator illustrated in FIG. 15 achieves the same effect as the variable optical attenuator illustrated in FIG. 14 but with a simpler construction. The arrangement illustrated in FIG. 15 may be applied not only to a variable optical attenuator as illustrated in FIG. 14, but to other constructions including the variable optical attenuator illustrated in FIG. 13.

Therefore, according to the above embodiments of the present invention, a variable optical attenuator includes a magnetooptical element and a magnetic circuit. A light signal travels through the magnetooptical element along a light path. The magnetic circuit (for example, an electromagnet) applies a variable magnetic field to the magnetooptical element. A permanent magnet applies a permanent magnetic field to the magnetooptical element. The variable magnetic field and the permanent magnetic field combine together to form a resulting, or "composite", magnetic field which is applied to the magnetooptical element for rotating the polarization of the light signal as the light signal travels through the magnetooptical element. The permanent magnetic field has a component in a direction which is parallel to the light path, so that, when no variable magnetic field is applied to the magnetooptical element by the magnetic circuit, the permanent magnetic field causes the polarization of the light signal to be rotated.

A description will now be given of an additional principle of a variable optical attenuator, according to embodiments of the present invention. When a variable optical attenuator is to be built into an optical transmission unit (that is, an optical transmitter), the driving power applied to a coil of a magnetic circuit for controlling the attenuation provided by the variable optical attenuator is preferably small in order to have low power consumption. For this purpose, it is necessary to efficiently apply a magnetic field produced by the magnetic circuit to a Faraday element.

Figure 16:
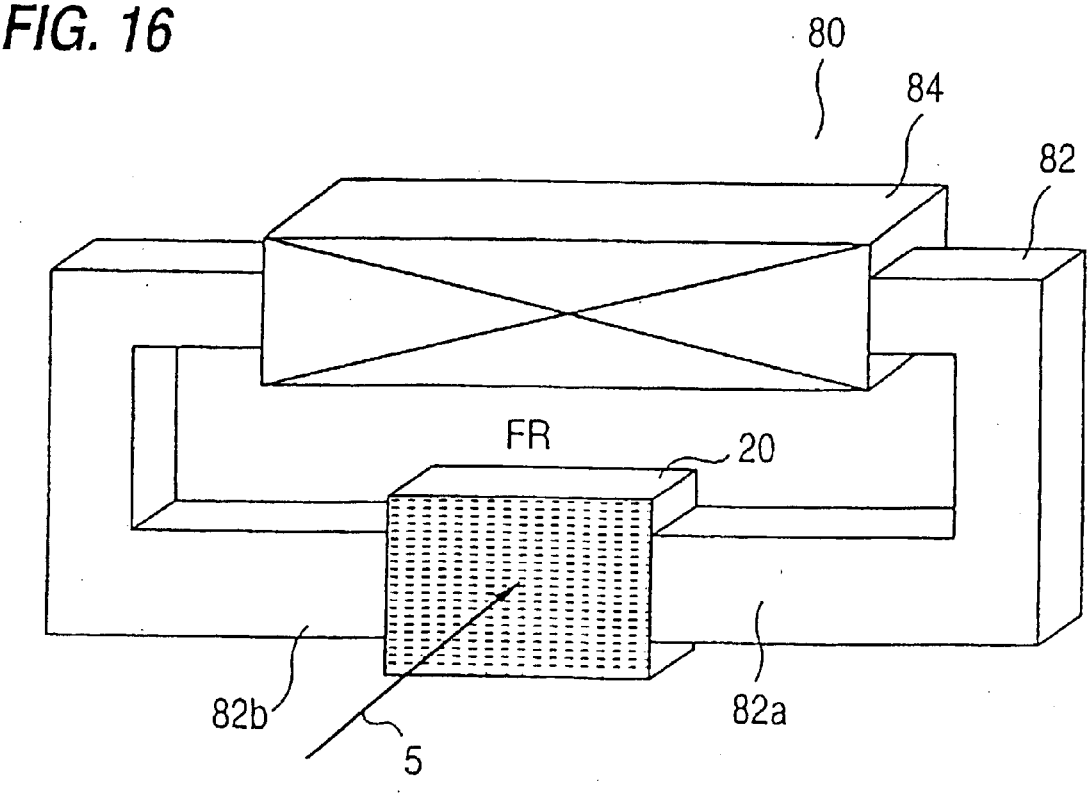
FIG. 16 is a diagram illustrating a magnetic circuit of a variable optical attenuator, according to an embodiment of the present invention.

FIG. 16 is a diagram illustrating a magnetic circuit of a variable optical attenuator, according to an embodiment of the present invention. Referring now to FIG. 16, an electromagnet 80 includes a yoke 82 and a coil 84. Yoke 82 has ends 82a and 82b with a gap between ends 82a and 82b. Faraday element 20 is positioned in the gap between ends 82a and 82b. Substantially no space exists between end 82a and Faraday element 20, and between end 82b and Faraday element 20. Thus, Faraday element 20 completely fills the gap between ends 82a and 82b. With this arrangement, the magnetic field produced in yoke 82 can be efficiently applied to Faraday element 20, with substantially no leakage occurring. As a result, Faraday element 20 is subject to a relatively strong uniform magnetic field. As compared to the a variable optical attenuator in which space exists between a Faraday element and the ends of a yoke, the current to be supplied to the coil can be reduced. In other words, the driving power for electromagnet 80 is relatively small, compared to a case where space exists between the ends of a yoke and a Faraday element.

As described above, substantially no space exists between end 82a and Faraday element 20, and between end 82b and Faraday element 20. Generally, it could be considered that "substantially no space" exists between an end of a yoke and a Faraday element if the actual space is less than or equal to 0.05 millimeters. However, generally, depending on the specific size and use of the magnetic circuit, the term "substantially no space" indicates that the gap should not be so large that the effect of the gap is overwhelming as compared to the Faraday element and the yoke. For example, in a preferable embodiment of the present invention, a Faraday element is typically about 1 mm in size, and a yoke is typically 30 mm in length. Assuming that the permeability of the yoke (formed, for example, of a silicon steel) is 300 times that of air and the permeability of the Faraday element is 3 times that of air, the effect of the gap may be overwhelming if the gap (one of the pair of gaps created at both sides of the Faraday element) is 0.2 mm in width. Such a gap would be considered to be undesireably large. Therefore, as described above, it would be preferably if the gap was less than or equal to 0.05 millimeters.

Figure 17A:
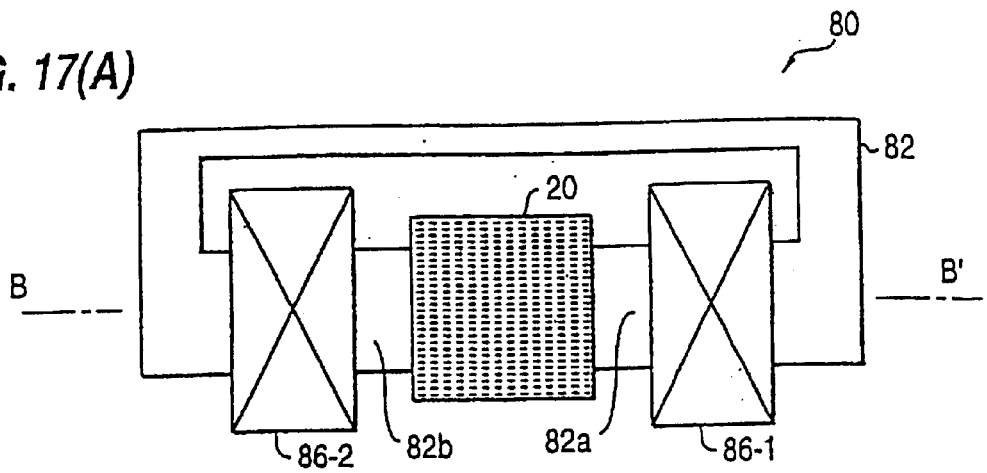
FIGS. 17(A) and 17(B) are diagrams illustrating a top sectional view and a lateral sectional view, respectively, of a modification of the magnetic circuit illustrated in FIG. 16, according to an embodiment of the present invention.
Figure 17B:
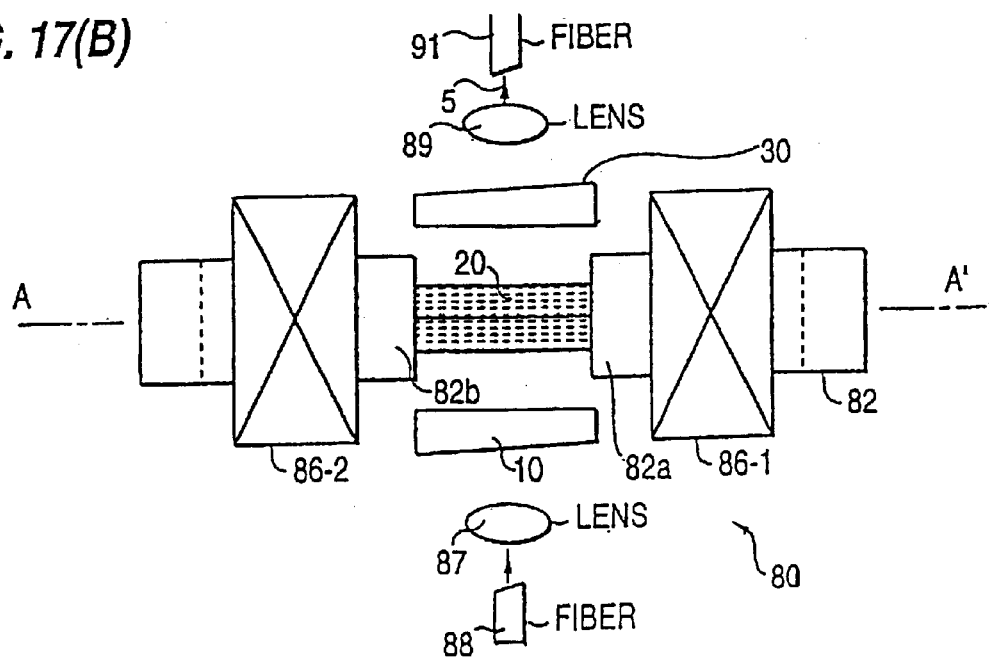

FIGS. 17(A) and 17(B) are diagrams illustrating a top sectional view and a lateral sectional view, respectively, of a modification of the magnetic circuit illustrated in FIG. 16, according to an embodiment of the present invention. The variable optical attenuator illustrated in FIGS. 17(A) and 17(B) is different from the variable optical attenuator illustrated in FIG. 16 in that two coils 86-1 and 86-2 forming part of electromagnet 80 are provided in the neighborhood of Faraday element 20, instead of a single coil such as coil 84 in FIG. 16. More specifically, coil 86-1 is around end 82a of yoke 82 and coil 86-2 is around end 82b of yoke 82.

By providing coils 86-1 and 86-1 near Faraday element 20, an effect caused by a magnetic resistance in yoke 82 is reduced so that the magnetic field produced in yoke 82 is efficiently supplied to Faraday element 20. This arrangement also ensures that the driving power for electromagnet 80 is reduced. Since the height of a loop formed by yoke 82 is reduced, the height of the variable optical attenuator is reduced. Hence, the variable optical attenuator can be easily mounted in an optical transmission unit.

In FIG. 17(B), wedge-shaped birefringence crystals are used as polarizer 10 and analyzer 30, so that polarization dependence is eliminated. The operation according to such an arrangement is disclosed in Japanese Laid-Open Patent Application No. 6-51255 entitled "OPTICAL ATTENUATOR", which is incorporated herein by reference.

FIGS. 17(A) and 17 (B) also illustrate a lens 87 for guiding light beam 5 from a fiber 88 to Faraday element 30, and a lens 89 for guiding light beam 5 from Faraday element 30 to a fiber 91.

An alternative method for applying the magnetic field produced in a yoke to a Faraday element is described below. Referring to FIGS. 16, 17(A) and 17(B), the narrower the gap between ends 82a and 82b of yoke 82 in which Faraday element 20 is inserted, the more efficiently the magnetic field is applied to Faraday element 20. Since the relative permeability of Faraday element 20 is not as great as that of yoke 82, a leakage magnetic field may be produced in the gap due to Faraday element 20.

For this reason, it is required that the gap between ends 82a and 82b of yoke 82 be as small as possible. Since the area through which light beam 5 is transmitted is reduced as a result of the narrowing of the gap, it is required that the diameter of a collimated light beam 5 be reduced. This requirement is met by shortening the focal length of lens 87. For example, when the focal length of lens 87 is reduced to 0.7 mm, the diameter of the collimated light beam 5 is approximately 140 $\mu$m. It is to be noted that, even considering the tolerance required in an assembling process, setting the size of the gap in between ends 82a and 82b of yoke 82 to 300 $\mu$m (approximately double the diameter of light beam 5) or less, for example, is relatively easy.

Therefore, according to the above embodiments of the present invention, a magnetooptical element and a magnetic circuit form a polarization rotation unit which rotates the polarization of a light signal. More specifically, the light signal travels through the magnetooptical element along a light path. The magnetic circuit applies a magnetic field to the magnetooptical element to rotate the polarization of the light signal. The magnetic circuit includes a yoke having first and second ends with a gap between the first and second ends. The magnetic field travels from the first end to the second end of the yoke, and the magnetooptical element is positioned in the gap. Moreover, the magnetooptical element fills the gap so that substantially no space exists between the magnetooptical element and the first end of the yoke, and substantially no space exists between the magnetooptical element and the second end of the yoke. In addition, the magnetic circuit can include a first coil around the first end of the yoke, and a second coil around the second end of the yoke. A first current is passed through the first coil and a second current is passed through the second coil to create the magnetic field, wherein the magnetic field is controllable by controlling the first and second currents.

Figure 18:
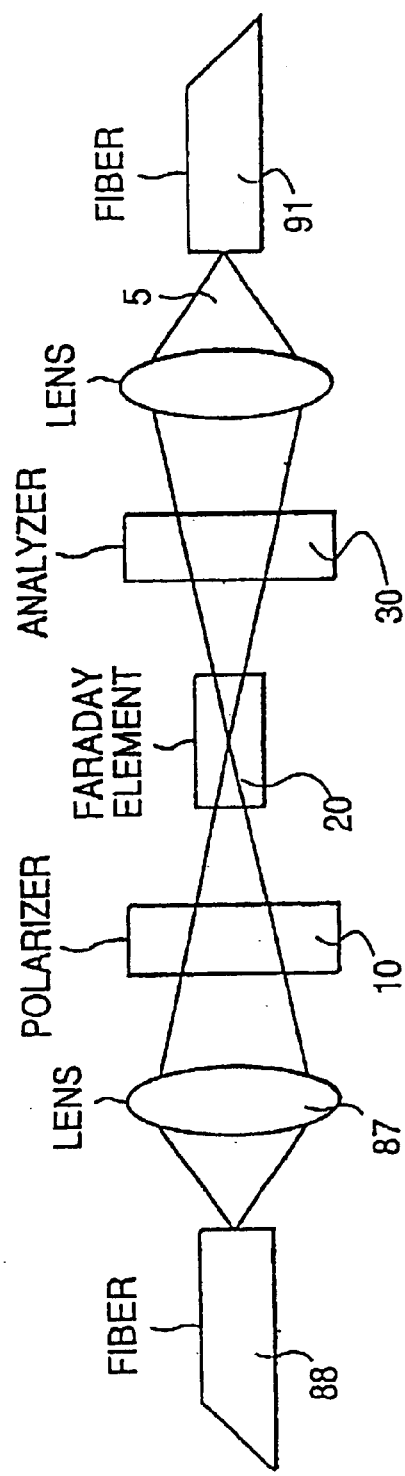
FIG. 18 is a diagram illustrating a variable optical attenuator, according to an additional embodiment of the present invention.

FIG. 18 is a diagram illustrating a variable optical attenuator, according to an additional embodiment of the present invention. To simplify the description, a magnetic circuit is not illustrated in FIG. 18. Referring now to FIG. 18, incident light beam 5 is focused on Faraday element 20 by lens 87. Thus, it is possible to make the gap betweens ends 82a (not illustrated in FIG. 18) and 82b (not illustrated in FIG. 18) of yoke 82 (not illustrated in FIG. 18) even narrower because the diameter of light beam 5 becomes as small as 100 $\mu$m. Using an optical system as illustrated in FIG. 18, the gap may be as narrow as 200 $\mu$m. Accordingly, it is possible to efficiently apply a magnetic field produced in yoke 82 to Faraday element 20 so that the driving power for electromagnet 80 is further reduced.

Therefore, according to the above embodiments of the present invention, lens 87 focuses light beam 5 on Faraday element 20. Then, the size of the gap between ends 82a and 82b of yoke 82 is determined in accordance with the diameter of light beam 5 as focused on Faraday element 20.

A description will now be given of an additional principle of a variable optical attenuator according to the embodiments of the present invention. More specifically, as discussed in more detail below, an optical fiber amplifier has a gain which is dependent on the wavelength of an amplified light signal. Thus, the wavelength dependence of the gain can be compensated for by taking advantage of the wavelength dependence of attenuation of a variable optical attenuator.

First, the following is a description of an optical fiber amplifier. A erbium-doped fiber amplifier (EDFA) is a known type of optical fiber amplifier. In an EDFA, a light beam, representing signal light, travels through an erbium-doped fiber. While the light beam travels through the fiber, the fiber is pumped with pump light from a laser diode. The pump light interacts with the fiber to cause the light beam to be amplified as the light beam travels through the fiber.

Figure 19:
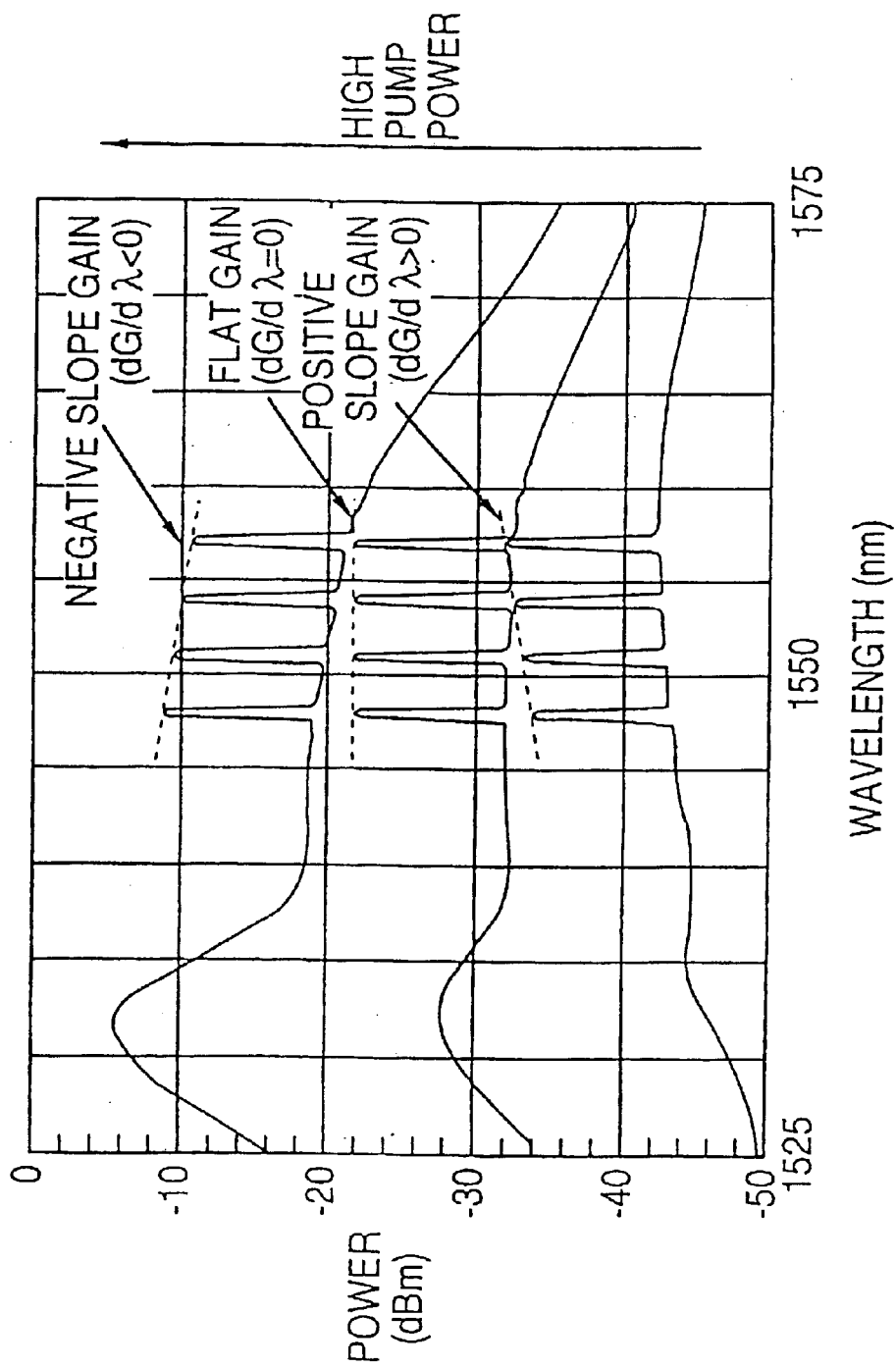
FIG. 19 is a graph illustrating typical amplification characteristics of an erbium doped fiber amplifier (EDFA).

FIG. 19 is a graph illustrating typical amplification characteristics of an erbium doped fiber amplifier (EDFA). More specifically, FIG. 19 shows typical gain characteristics as the pump power of a laser diode which supplies pump light to the EDFA is varied. Referring now to FIG. 19, four-wave multiplexed signals are amplified, the wavelength of each channel being located in the neighborhood of 1550 nm. From FIG. 19, it can be seen that the peak gain of the EDFA is located near 1535 nm, where the gain characteristic is not flat. Accordingly, the wavelength bandwidth in the neighborhood of 1540–1560 nm characterized by a flat gain characteristic is used.

However, even in this wavelength bandwidth, the wavelength dependence may increase according to the operating conditions of the optical fiber amplifier. As illustrated in FIG. 19, when the input power is increased while the output power is maintained at a constant level, or when the output power is increased while the input power is maintained at a constant level (as indicated by a curve at the bottom of the graph illustrated in FIG. 19), a rising gain characteristic slope from the 1540-nm side to the 1560-nm side occurs.

In an optical communication system, the length of an optical fiber differs depending on the location at which it is installed. As a result, the power input to the optical fiber differs from location to location. Because the input power differs from location to location, a wavelength dependence of the gain occurs. To prevent the wavelength dependence from occurring, it is necessary to maintain the gain of the optical fiber amplifier at a constant level. If the gain is maintained at a constant level, the inversion population of erbium (Er) ions in the EDFA is constant, thus reducing a variation in the wavelength dependence. In this case, there are two additional problems.

The first problem is that, if the gain of the optical fiber amplifier is maintained at a constant level, the output power varies according to the input power. Because a light beam used in the long-range optical transmission is contained in a significantly small region within optical fibers, a nonlinear optical effect becomes distinct. In order to cancel the nonlinear optical effect, it is necessary to control the input power of the optical fiber.

Figure 20:
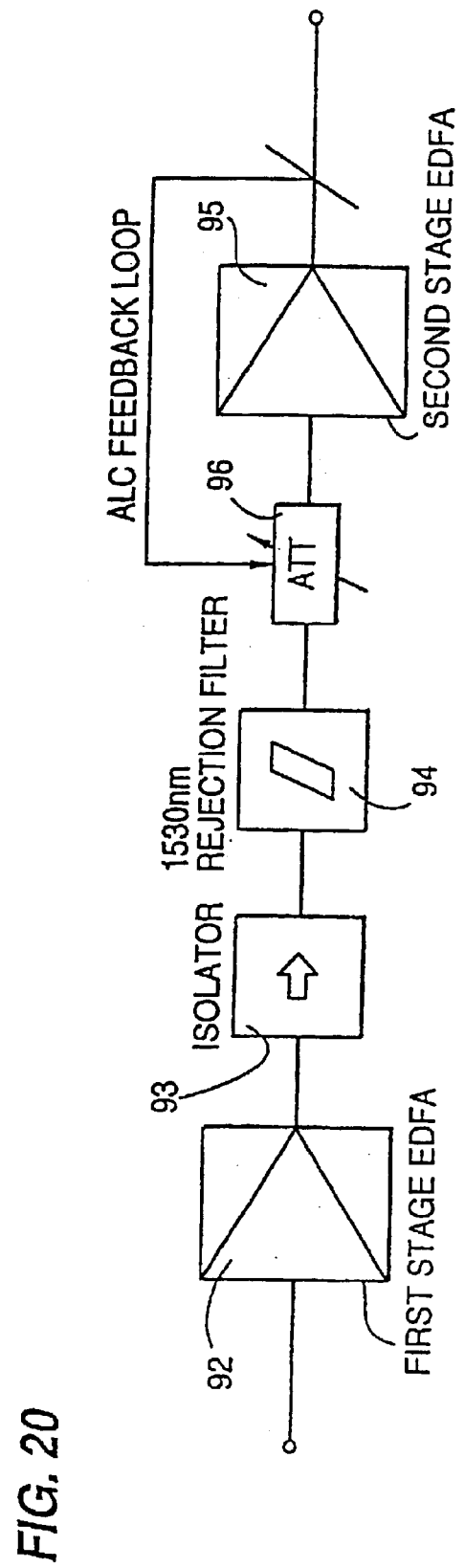
FIG. 20 is a diagram illustrating an optical transmission unit having a variable optical attenuator, according to an embodiment of the present invention.

FIG. 20 is a diagram illustrating an optical transmission unit having a variable optical attenuator, according to an embodiment of the present invention. More specifically, FIG. 20 shows a two-stage optical amplifier with a variable optical attenuator connected thereto so as to maintain the optical output at a constant level. Such a two-stage-optical amplifier is disclosed, for example, in U.S. patent application titled MULTI-WAVELENGTH LIGHT AMPLIFIER, U.S. Ser. No. 08/655,027, filed May 28, 1996, which is incorporated herein by reference.

The gain of the optical fiber amplifier should be maintained at a constant level so as to reduce the wavelength dependence of the gain. To reduce the wavelength dependence of the gain, it is necessary to prove a correspondingly large pump power of pump light to the optical fiber. However, this increases the power consumption and the scale of an optical transmission unit using such an optical fiber amplifier.

A second problem is that the pump power must be large if the gain of the optical fiber amplifier is to be controlled at a constant level and the wavelength dependence of the gain is to be reduced. By setting the inverse population to a predetermined state, it is possible to obtain a flat gain slope in the wavelength range of 1540–1560 nm. However, for such a flat slope, it is necessary to provide a large pump power. If the pump power is low, an incomplete inverse population results so that the gain slope rises toward the long-wavelength side. In a conventional approach to resolve this problem, an optical filter having a large loss in the long wavelength range is used so that the wavelength dependence of the gain can be reduce using a relatively low pump power. However, the use of an optical filter causes an optical transmission unit to be relatively complex.

A variable optical attenuator according to the above embodiments of the present invention can be used to solve the above-described problems associated with the wavelength dependent gain of an optical amplifier.

More specifically, referring now to FIG. 20, a light beam is amplified by an EDFA 92, passed through an isolator 93, a rejection filter 94 and an EDFA 95. A variable optical attenuator (ATT) is positioned between EDFA 92 and EDFA 95. Thus, a light beam is amplified in two stages, where EDFA 92 represents a first stage EDFA, and EDFA 95 represents a second stage EDFA. As a result, EDFA 92 and EDFA 95 together form a two-stage optical amplifier.

As an example, EDFA 92 is an EDFA which uses a high alumina codoped erbium doped fiber (EDF), provides automatic gain control (AGC) between the input and the output of EDFA 92, and uses 980 nm pump light. Also, as an example, EDFA 95 is an EDFA which uses a high alumina codoped erbium doped fiber (EDF), provides automatic gain control (AGC) between the input and the output of EDFA 95, and uses 1480 nm pump light. However, the frequencies of pump light for the various EDFAs and the types of doped fiber can easily be determined by a person skilled in the art based on the transmitted frequencies and the desired characteristics of the optical communication system.

Variable optical attenuator 96 can be any of the variable optical attenuators of the above embodiments of the present invention. For example, variable optical attenuator 96 can be the variable optical attenuator illustrated in FIGS. 1, 12, 13, 14, 15, 16, 17(A), 17(B) or 18.

Parameters such as the angular disposition of a polarizer (not illustrated in FIG. 20), an analyzer (not illustrated in FIG. 20), and the length of a Faraday element (not illustrated in FIG. 20), of variable optical attenuator 96, are adjusted so that the variable optical attenuator has a wavelength dependence contrary to the wavelength dependence of the optical amplifier as indicated by the curve at the bottom in FIG. 19 (the wavelength dependence resulting when the output power is large).

This use of a variable optical attenuator to compensate for characteristics of an optical amplifier is not intended to be limited to the use with a two-stage optical amplifier. Instead, a variable optical attenuator can be used with other types of optical amplifiers, such as single stage optical amplifiers, to compensate for characteristics of the optical amplifier.

Figure 21:
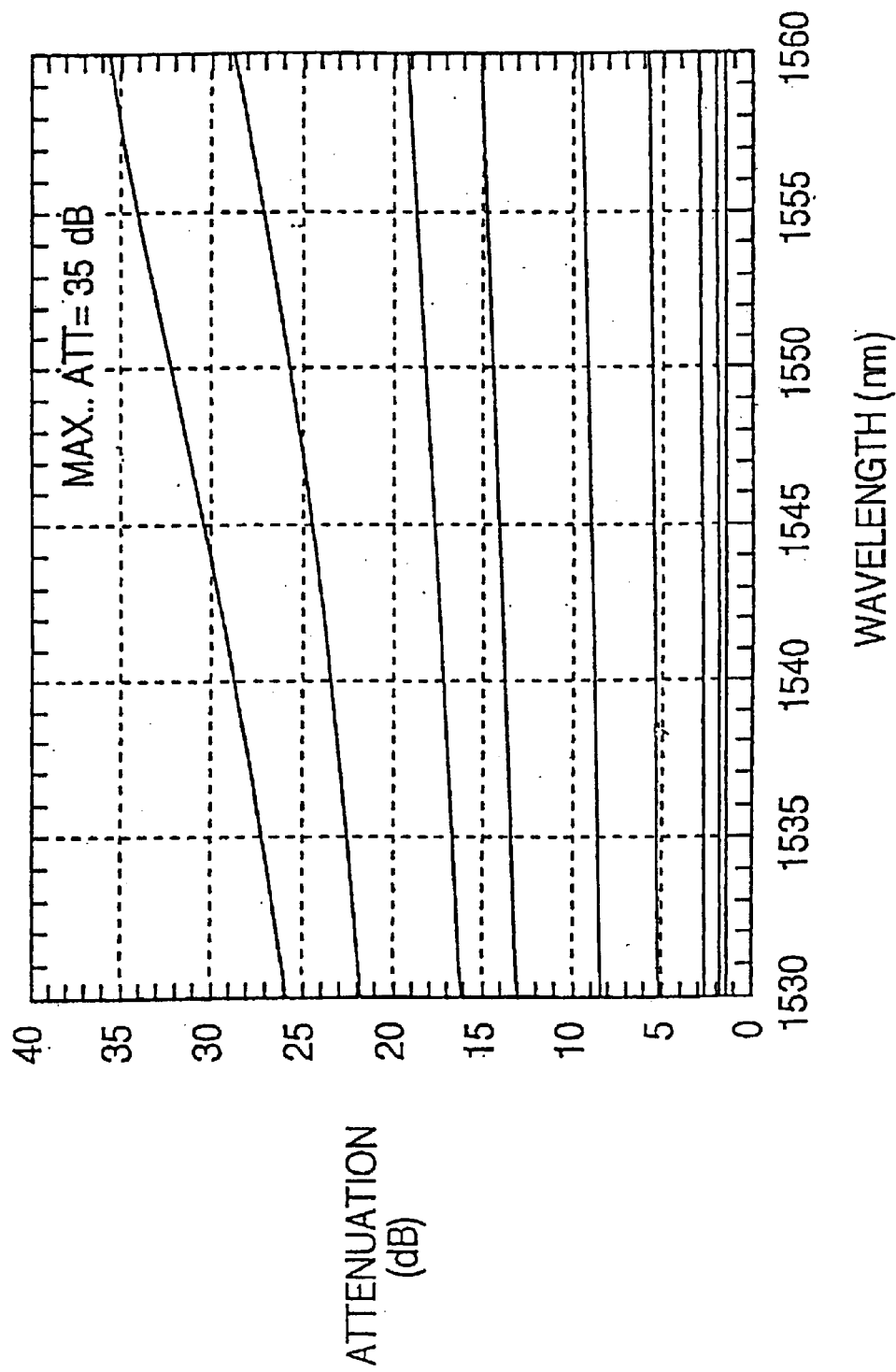
FIG. 21 is a graph illustrating an attenuation characteristic of a variable optical attenuator adjusted to cancel the wavelength dependence of an optical amplifier, according to an embodiment of the present invention.

FIG. 21 is a graph illustrating an attenuation characteristic of a variable optical attenuator adjusted to cancel the wavelength dependence of an optical amplifier, according to an embodiment of the present invention. As illustrated in FIG. 21, the attenuation increases toward the long wavelength side.

By employing a variable optical attenuator according to the above embodiments of the present invention in a transmission unit, it is not required to use optical filter for canceling the wavelength dependence.

Further, since the wavelength dependence in a variable optical attenuator according to the above embodiments of the present invention can be configured to be greater as the attenuation is greater, the wavelength dependence of the gain of an optical fiber amplifier can be successfully canceled. More specifically, assuming that there is an ideal optical fiber amplifier capable of controlling the gain at a constant level irrespective of the input power, it would not be necessary to cancel any wavelength dependence of the gain. However, the pump power of actual optical fiber amplifiers is limited. Hence, when the input power increases, it is necessary to raise the pump power in order to control the gain at a constant level. Because the optical output is maintained at a constant level, the attenuation of the variable optical attenuator increases.

When the input power further increases so that the pump power reaches a maximum level, it is difficult to maintain a constant inverse population, resulting in the gain of the optical fiber amplifier being raised toward the long wavelength side. In case the upper limit of the pump power is relatively low, the above-described increase is more likely to occur. Thus, if the variable optical attenuator has a characteristic such that the wavelength dependence becomes greater as the attenuation increases, the wavelength dependence of the gain can be effectively canceled even if the upper limit of the pump power is low. Accordingly, it is possible to set the pump power for the optical amplifier to a low level so that an optical fiber amplifier characterized by a compact size and a low power consumption can be produced.

The temperature dependence of the attenuation provided by a variable optical attenuator having a large wavelength dependence will naturally be large. Therefore, it is desirable that such a variable optical attenuator has a control circuit for controlling the temperature of the Faraday element at a constant level.

Therefore, according to the above embodiments of the present invention, an apparatus includes an optical amplifier and an optical attenuator. The optical amplifier amplifies a light signal and has a wavelength dependent gain. The optical attenuator attenuates the light signal, and has a wavelength dependent attenuation which opposes the wavelength dependent gain of the optical amplifier. The optical attenuator includes a polarizer, a polarization rotation unit, and an output unit. The polarizer polarizes the light signal in a first direction. The polarization rotation unit rotates the polarization of the polarized light signal to produce a polarization rotated light signal having a polarization component in the first direction and a polarization component in a second direction. The output unit passes the polarization component in the second direction of the polarization rotated light signal and blocks the polarization component in the first direction of the polarization rotated light signal. The wavelength dependent attenuation of the optical attenuator can be determined by the relationship between the first and second directions.

A description will now be given of a further principle of a variable optical attenuator according to embodiments of the present invention. In a variable optical attenuator operated on the basis of magnetooptical effect, the driving current applied to an electromagnet to increase the attenuation and maintain the attenuation at a constant level might be different from the driving current applied to decrease the attenuation and maintain the attenuation at a constant level. This difference is caused by the Faraday rotation and the hysteresis of the magnetic circuit.

Figure 22:
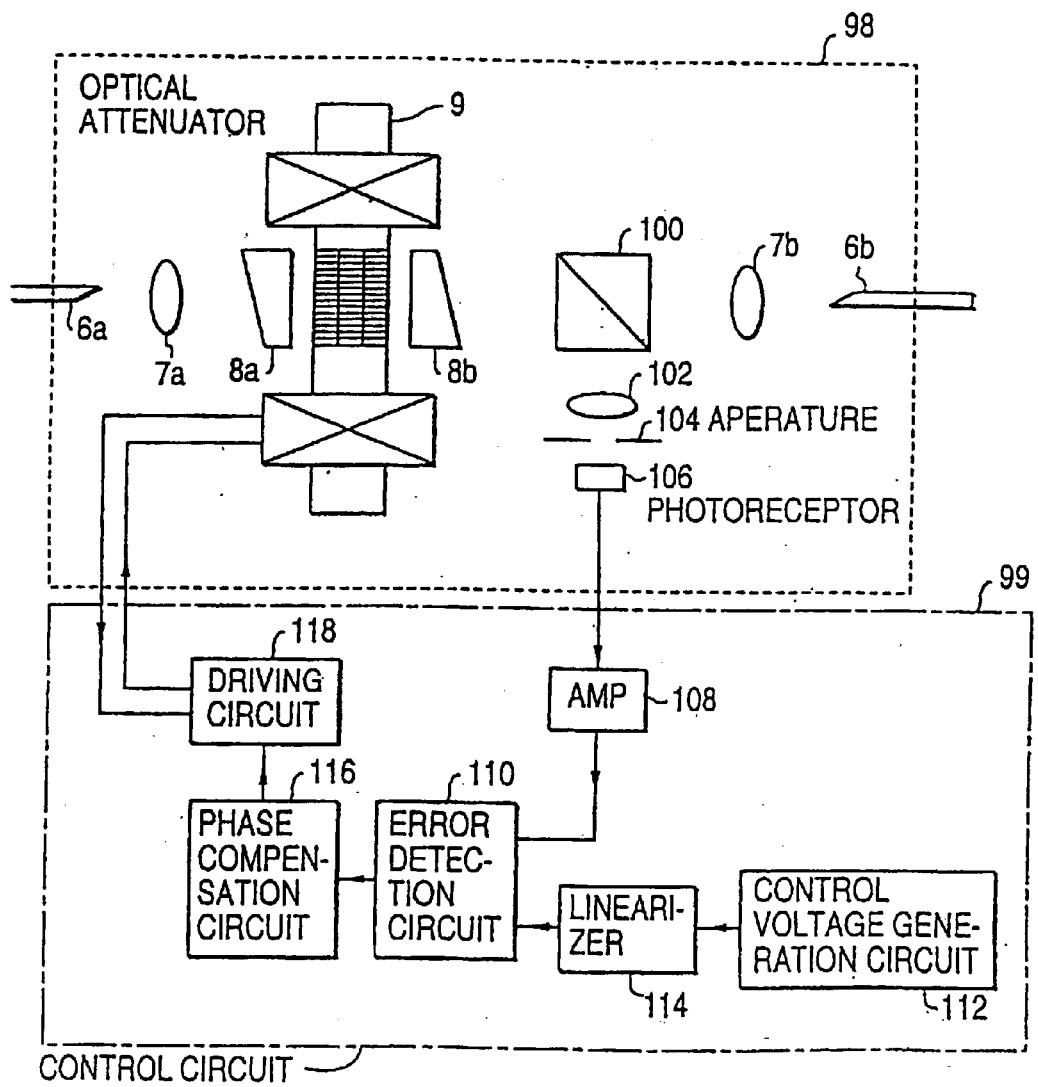
FIG. 22 is a diagram illustrating a variable optical attenuator, according to a further embodiment of the present invention.

FIG. 22 is a diagram illustrating a variable optical attenuator 98 and a control circuit 99 for controlling variable optical attenuator 98, according to a further embodiment of the present invention. With variable optical attenuator 98, variation in the input power to the variable optical attenuator can be suppressed, and the output power of the variable optical attenuator can be maintained at a constant level.

Figure 29:
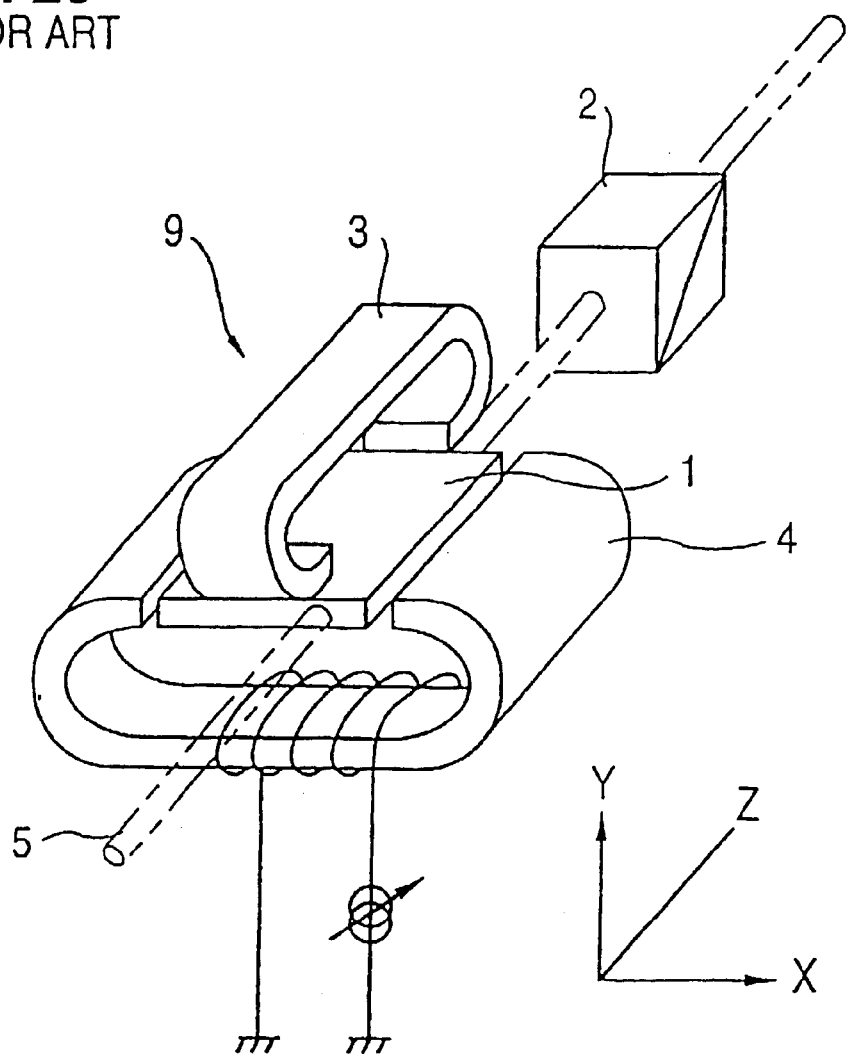
FIG. 29 (prior art) is a diagram illustrating a conventional variable optical attenuator.
Figure 30:
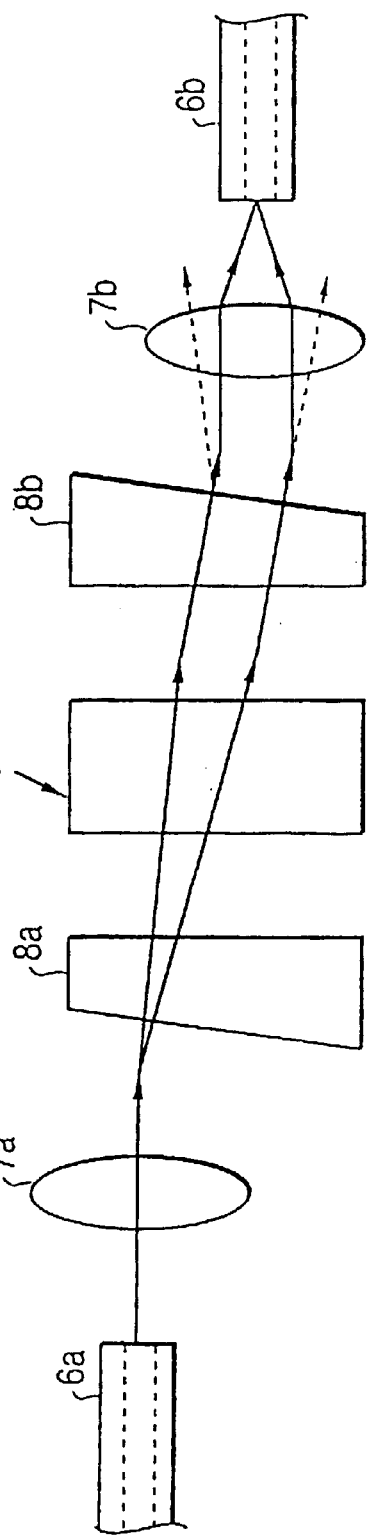
FIG. 30 (prior art) is a diagram illustrating a conventional variable optical attenuator.
Figures 31, 32:
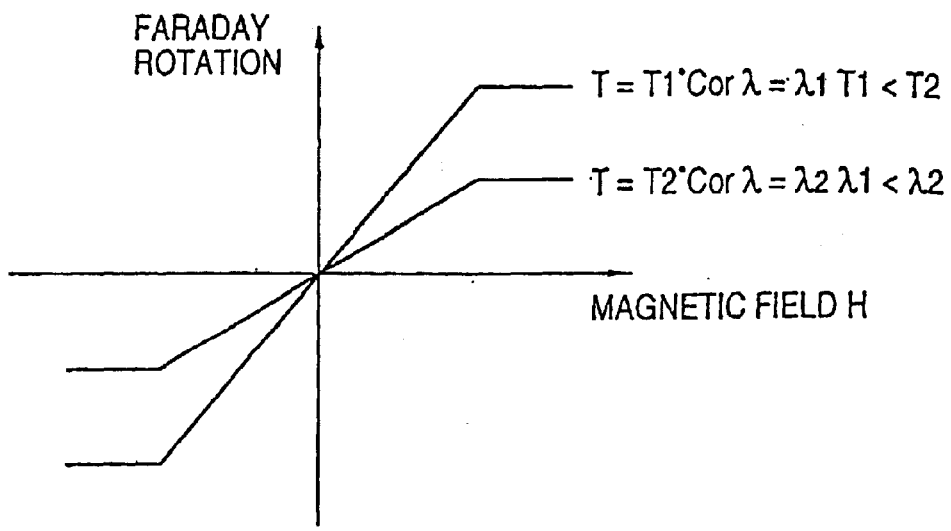
FIG. 31 is a graph illustrating a relationship between a magnetic field H and Faraday rotation.
FIG. 32 is a diagram indicating wavelength dependence and temperature dependence of the Faraday rotation of a Faraday element.

Referring now to FIG. 22, variable optical attenuator 98 makes use of the construction illustrated in FIG. 30. More specifically, a light beam supplied by an optical fiber 6a is led to an optical fiber 6b by a birefringent effect provided by birefringent crystals 8a and 8b. Thus, birefringent crystals 8a and 8b form a polarizer and an analyzer, respectively. Lenses 7a and 7b are used to focus the light beam. A Faraday rotator 9, such as the variable optical attenuator illustrated in FIG. 29 or in the above-described embodiments of the present invention, is between birefringement crystals 8a and 8b. All or part of the light beam can be led to optical fiber 6b by adjusting the Faraday rotation provided by Faraday rotator 9. Thus, the power of the light signal can be variably attenuated.

Birefringent crystals 8a and 8b are each wedge-shaped optical material, such as a rutil ($TiO_2$: titanium dioxide) or a calcite, having birefringence so as to reduce the polarization dependence of the attenuation. When a space beam, instead of a light beam, emitted by optical fiber 6a at an input side of optical fiber 6b or at an output side of Faraday rotator 9, is to be attenuated, or when a polarization conserved optical fiber is used as an input fiber or an output fiber, the linear polarized beam is fed to variable optical attenuator 98. In this instance, a polarization isolator, comprising a normal prism or a dielectric multilayer film, is used to form a polarizer and an analyzer. To simplify explanation, a permanent magnet for providing a bias magnetic field is not illustrated in FIG. 22.

Variable optical attenuator 98 includes a photocoupler 100 for branching the light beam into two separate light beams subjected to birefringence, a lens 102, an aperture 104 for passing one of the separated light beams, and a photoreceptor 106 for monitoring an optical power of the light beam passing through aperture 104. The attenuation of variable optical attenuator 98 is controlled so that the optical power is maintained at a predetermined level.

The branching ratio of photocoupler 100 is set so that the attenuation for a main signal supplied to fiber 6b is relatively small and the branched light beam can be properly monitored by photoreceptor 106. For example, the branching ratio is set in the range of 10:1–20:1.

If a birefringent tapered plate is used to form the polarizer and the analyzer, the polarization direction of the light beam is rotated by Faraday rotor 9 so that the beam coupling position in optical fiber 6b is displaced. As a result, the attenuation operation is conducted such that a portion of the light beam fails to be supplied to optical fiber 6b.

When the attenuation is 0, the light beam is coupled at the center of the core in optical fiber 6b. When the polarization direction of the light beam is subject to Faraday rotation to provide the attenuation, the light beam is coupled at a position displaced from the core so that the optical power is attenuated.

In this arrangement, the entirety of the light beam fails to be fed to photoreceptor 106 and the optical power cannot be properly measured unless the light sensing area of photoreceptor 106 is sufficiently small. Even if the coupling position is displaced, the attenuation cannot be measured if the light sensing diameter is larger than the displacement of the coupling position. By setting the focal length of lens 102 near photoreceptor 106 to an appropriate dimension, it is ensured that the light sensing area of photoreceptor 106 is larger than the area of the core of optical fiber 6b. For this reason, aperture 104 is provided in front of photoreceptor 106. Aperture 104 is not necessary if the light sensing area of photoreceptor 106 is sufficiently small.

The following is a description of control circuit 99. More specifically, an electric signal is obtained as a result of photoelectric conversion by photoreceptor 106. The electric signal is amplified by an amplifier (AMP) 108 to an appropriate level. The amplified electric signal is fed to an error detection circuit 110. A control voltage generation circuit 112 produces a voltage that corresponds to a desired optical power. A linearizer 114 is provided to correct the relationship between the power supplied to a coil of variable optical attenuator 98 and the attenuation. The Faraday rotation is in proportion to the power supplied, while the attenuation is in proportion to $\cos_2\theta$(where $\theta$ is the Faraday rotation). Accordingly, the set voltage is corrected so that a logarithmic or linear relationship exists between the set voltage and the output optical power. The set voltage is fed to error detection circuit 110 together with the amplified electric signal from amplifier 108. The difference between the electric signal and the set voltage is output as an error signal, which is a target of control.

Using the error signal output by error detection circuit 110, a phase compensation circuit 116 adjusts a time constant for controlling Faraday rotators. Since the coil forming part of Faraday rotator 9 has an inductance, the response characteristic may be degraded, causing ringing. For this reason, phase compensation circuit 116 adjusts the frequency characteristic of control circuit 99 to prevent the ringing from occurring. Driving circuit 118 is a power amplifier for driving the coil.

With the above-described control, the output power corresponding to the set voltage produced by control voltage generation circuit 112 can always be obtained. Control voltage generation circuit 112 is capable of remote control by externally supplying a control voltage.

Therefore, with variable optical attenuator 98 and control circuit 99 illustrated in FIG. 22, it is possible to correct temperature dependent characteristic, time-dependent degradation and variation in the polarization loss.

Therefore, according to the above embodiments of the present invention, an apparatus includes a polarization rotation unit (for example, Faraday rotator 9 and birefringent crystal 8a), an output unit (for example, birefringent crystal 8b), and a control device (for example, control circuit 99). The polarization rotation unit receives a light signal and rotates the polarization of the light signal to produce a polarization rotated light signal. The output unit passes at least a portion of the polarization rotated light signal as an output signal. The control device determines the power level of the output signal and controls the amount of rotation of the polarization rotation unit to maintain the power level of the output signal at a constant value.

Figure 23:
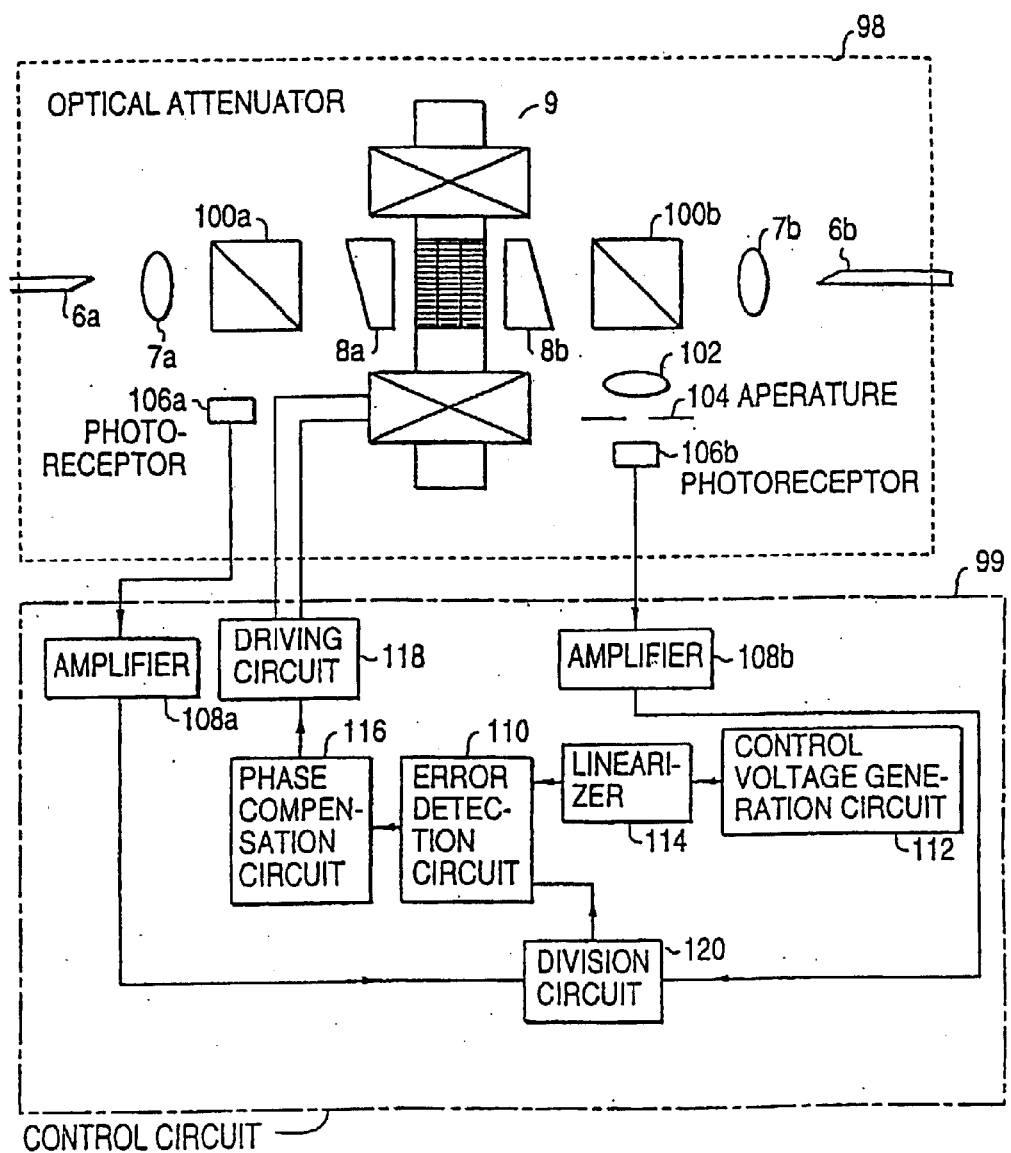
FIG. 23 is a diagram illustrating a modification to the variable optical attenuator illustrated in FIG. 22, according to an embodiment of the present invention.

FIG. 23 is a diagram illustrating a modification to the variable optical attenuator illustrated in FIG. 22, according to an embodiment of the present invention. The variable optical attenuator illustrated in FIG. 23 differs from that illustrated in FIG. 22 in that a mechanism for branching a light beam and for sensing the branched light beam are provided at the input of Faraday rotator 9. As a result, it is possible to obtain a predetermined attenuation irrespective of the input optical power.

Referring now to FIG. 23, a variable optical attenuator 101 is controlled by a control circuit 103. A photocoupler 100a and a photoreceptor 106a are provided at the input side of Faraday rotator 9. A portion (for example, 1/10–1/20) of the input optical power is branched and monitored by photoreceptor 106a. Since a portion of the input optical power is branched before being transmitted through the polarizer (birefringent crystal 8a) composed of a birefringent tapered plate, an aperture (such as aperture 104) is not required for limiting the light sensing diameter.

In variable optical attenuator 101, an electrical signal obtained from photoreceptor 106a at the input side of Faraday rotator 9 is amplified by an amplifier 108a to an appropriate level. Similarly, an electrical signal obtained from a photoreceptor 106b at the output side of Faraday rotator 9 is amplified by an amplifier 108b to an appropriate level. The amplified signals from amplifiers 108a and 108b are fed to a division circuit 120. Division circuit 120 calculates a ratio between the output power and the input power. The result of the calculation is fed to error detection circuit 110. At the same time, a set voltage that corresponds to the attenuation is fed to error detection circuit 110. Error detection circuit 110 detects a control error signal, which is compensated for phase. The control error signal is supplied to driving circuit 118 to drive the coil of Faraday rotator 9. Therefore, control circuit 103 controls the ratio of the input power and the output power to be a constant level so that the attenuation of variable optical attenuator 101 is maintained at a constant level.

Therefore, according to the above embodiments of the present invention, an apparatus includes a polarization rotation unit (for example, Faraday rotator 9 and birefringent crystal 8a), an output unit (for example, birefringent crystal 8b), and a control device (for example, control circuit 103). The polarization rotation unit receives a light signal and rotates the polarization of the light signal to produce a polarization rotated light signal. The output unit passes at least a portion of the polarization rotated light signal as an output signal. The control device determines the power level of the received light signal and the power level of the output signal and controls the amount of rotation of the polarization rotation unit to maintain a ratio of the power level of the output signal to the power level of the received light signal at a constant value.

The following is a description of an additional principle of a variable optical attenuator according to embodiments of the present invention. More specifically, it is preferable for a variable optical attenuator to be sufficiently compact to be mounted in an optical transmission unit. In some cases, the optical transmission unit may be constructed such that a plurality of printed boards having components mounted thereon are layered. In this regard, it is desirable for a variable optical attenuator to have a small height. Further, to reduce power consumption in the optical transmission unit, it is important to reduce the power consumption of the variable optical attenuator.

Figure 24A:
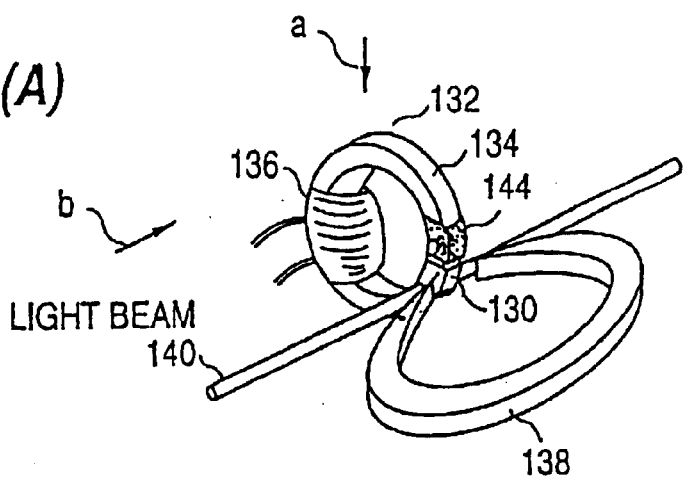
FIGS. 24(A), 24(B) and 24(C) are an overview, a top view and a front view, respectively, of a variable optical attenuator according to a further embodiment of the present invention.
Figure 24B:
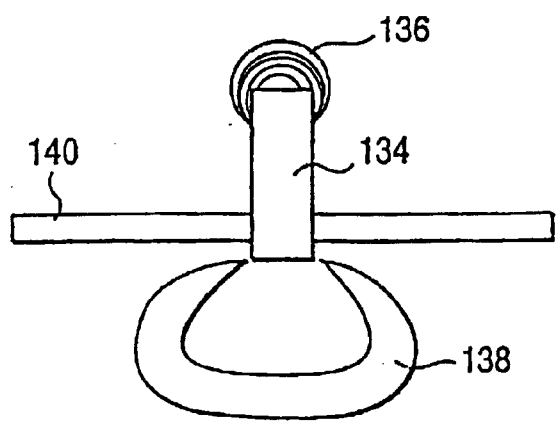
Figure 24C:
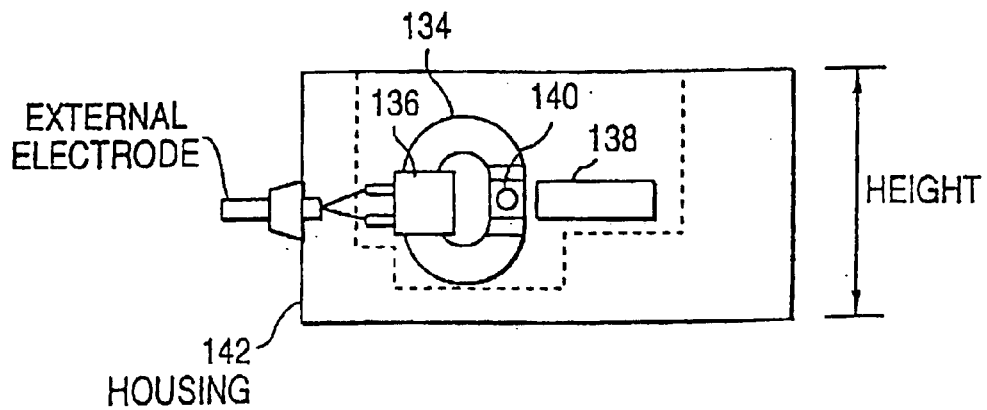

FIGS. 24(A), 24(B) and 24(C) are an overview, a top view and a front view, respectively, of a variable optical attenuator according to a further embodiment of the present invention. More specifically, FIG. 24(B) is a view taken in the direction "a" illustrated in FIG. 24(A), and FIG. 24(C) is a view taken in the direction "b" illustrated in FIG. 24(A). To simplify the description, FIGS. 24(A), 24(B) and 24(C) illustrate a Faraday rotator but do not illustrate a polarizer or an analyzer.

The Faraday rotator illustrated in FIGS. 24(A), 24(B) and 24(C) includes a Faraday element 130, an electromagnet 132 and a permanent magnet 138. Electromagnet 132 includes a yoke 134 and a coil 136. Yoke 134 of electromagnet 132 and permanent magnet 138 are each configured in a ring, or horseshoe, shape. Faraday element 130 is provided in a gap between ends of yoke 134. Electromagnet 132 applies a magnetic field to Faraday element 130 in a direction perpendicular to the propagation direction of a light beam 140, and permanent magnet 138 applies a magnetic field to Faraday element 130 in the propagation direction of light beam 140.

FIG. 24(C) shows how the variable optical attenuator is accommodated in a housing 142. Referring now to FIG. 24(C), the gap in electromagnet 132 extends in a direction of the height of housing 142. Thus, light beam 140 is transmitted substantially through the center of the height of housing 142.

It is desirable for an optical device to have a small height for it to be properly mounted. The height of the variable optical attenuator illustrated in FIGS. 24(A), 24(B) and 24(C) largely depends on the diameter of the ring-shaped yoke 134 of electromagnet 132. For optimal interface with external equipment, the light beam transmitted in the variable optical attenuator is preferably made to travel through the center of the height thereof. In the variable optical attenuator illustrated in FIG. 29, a space large enough to house the diameter of a ring-shaped yoke is necessary both above and below the light beam if the light beam is to travel the center of the height of the variable optical attenuator, thus causing the variable optical attenuator to have a relatively high height. In contrast, in the variable optical attenuator illustrated in FIG. 24, a space only large enough to house the radius of the ring-shaped yoke 134 is necessary above and below light beam 140. In this manner, the height of the variable optical attenuator can be reduced.

Therefore, according to the above embodiments of the present invention, a yoke of a variable optical attenuator is mounted on a mounting board so that the entire length of the gap between ends of the yoke extends adjacent to the mounting board.

Referring now to FIG. 24(B), permanent magnet 138 is horseshoe-shaped and is adjacent to Faraday element 130 so as to sandwich Faraday element 130 without blocking the path of light beam 140. FIG. 24(B) also shows that the yoke of permanent magnet 138 is narrowed toward its end. In comparison with the variable optical attenuator illustrated in FIG. 29, the above-described construction ensures that the magnetic field of permanent magnet 138 is efficiently applied to Faraday element 130, and that the magnetic field produced by the permanent magnet 138 will not leaking outside of Faraday element 130. With this arrangement, it is possible to prevent the control of electromagnet 132 from becoming excessively complex. Another advantage is that the magnetic force of permanent magnet 138 may be relatively small.

Moreover, the ends of the yoke of permanent magnet 138 can be closer to Faraday element 130 than the ends of yoke 134 of electromagnet 132.

Referring now to FIG. 24(A), yoke 134 of electromagnet 132 contains a semi-hard magnetic material 144 near the gap. In the variable optical attenuator illustrated in FIG. 29, the entirety of the yoke is formed by a soft magnetic material so that it is necessary to keep feeding a current to the electromagnet in order to maintain the magnetic field. If a semi-hard magnetic material (such as semi-hard material 144) is used in a yoke of the electromagnet, as illustrated in FIG. 24(A), the yoke is subject to the magnetic field by applying a pulse current. That is, even when the current is cut off, the magnetization is maintained. Accordingly, it is possible to reduce the power consumption of the variable optical attenuator. It is not necessary for the entirety of the yoke to be made of a semi-hard magnetic material. Only a portion of the yoke needs to be made of the semi-hard magnetic material, as illustrated in FIG. 24(A).

The semi-hard magnetic material exhibits a relatively stable magnetization characteristic in a saturation zone, but has a significant hysteresis characteristic in the non-saturation zone. Thus, it is difficult to obtain a stable magnetization in the semi-hard magnetization. Therefore, it is difficult to control the medium-range magnetization. A construction for resolving this difficulty is illustrated in FIG. 25.

Figure 25:
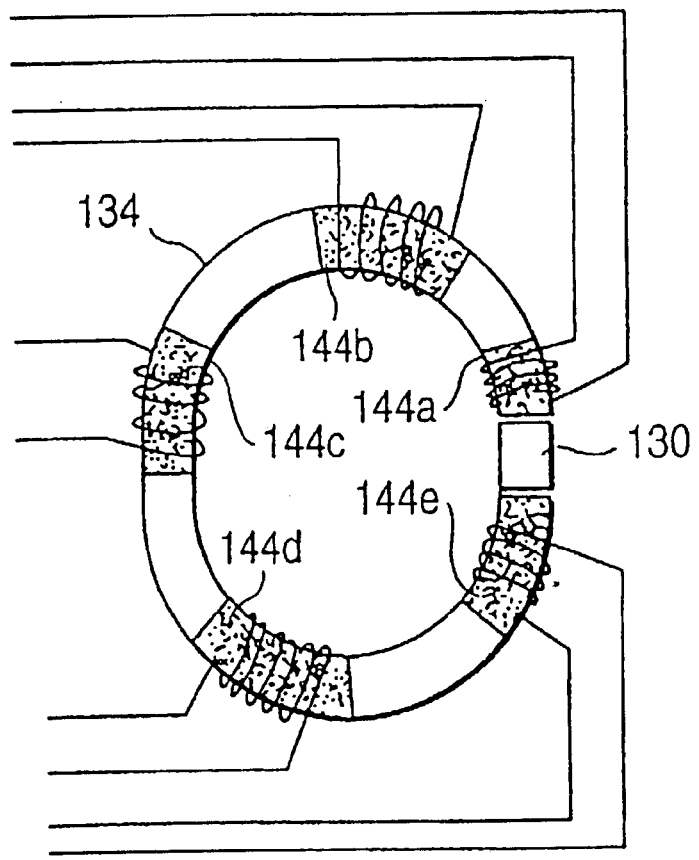
FIG. 25 is a diagram illustrating an electromagnet of a variable optical attenuator, according to an embodiment of the present invention.

More specifically, FIG. 25 is a diagram illustrating an electromagnet for use in a variable optical attenuator, according to an embodiment of the present invention. Referring now to FIG. 25, a plurality of semi-hard magnetic materials 144a–144e, each having different magnetic forces in the saturation zone, are used to form portions of yoke 134 of an electromagnet. Each semi-hard magnetic material 144a–144e is provided with an associated coil so that it is possible to individually drive semi-hard magnetic materials 144a–144e in the saturation zone. Thus, by turning ON and OFF the current supplied to the coils, it is possible to drive only the desired semi-hard magnetic material so as to stabilize the magnetic field produced in the electromagnet by effecting graded control.

Moreover, each semi-hard magnetic material 144a–144e can have different magnetization characteristics, and the magnitude of a magnetic field produced by the electromagnet can be changed in grades by controlling the magnetization in each of semi-hard magnetic materials 144a–144e.

Semi-hard magnetic materials are well-known. More specifically, a permanent magnet is typically used statically (that is, without any modification to its characteristics after an initial magnetization). Recently, however, many permanent magnets are used dynamically such that the magnetization is modified by applying an external magnetic field. Dynamic permanent magnets are often used in relays, semi-stationary memories and hysteresis motors. Examples of relays in which a dynamic permanent magnet is used are a latching relay for an electronic exchange, a ferreed relay and a normal reed relay sealed in a glass. All of these relays are self-hold relays. Semi-stationary memories, an example of which is a twister memory, are memories capable of storing fixed information content and allowing the same to be repeatedly read. Hysteresis motors are a type of synchronous motor producing a torque by the hysteresis of the material constituting the motor. Hysteresis motors are often used as a micromotor. In any of the applications of a dynamic permanent magnet, it is desirable to have a larger saturation magnetic flux density $B_s$ and a higher square-loop characteristic $B_r/B_s$. The coercive force required of the dynamic permanent magnet is, for example, 10–30 Oe in the case of a semi-stationary memory and 100–200 Oe in the case of a hysteresis motor. That is, the required coercive force is on the mid-point of the scale between the coercive force of the permanent magnet and that of the high permeability magnetic material. A magnetic material with square-loop hysteresis and a coercive force on such an order is referred to as a semi-hard magnetic material.

For the above embodiments of the present invention, preferable semi-hard materials for use in a yoke are Nibcoloy (85Co, 12Fe, 3Nb) and a Co—Cr steel (15Co, 4.5Cr, 0.82C, 0.5Mn, Residual Fe).

A description will now be given of a further principle of variable optical attenuator, according to an embodiment of the present invention. More specifically, as described with reference to the variable optical attenuator illustrated in FIG. 30, a slight polarization dependence loss occurs in a variable optical attenuator using a wedge-shaped birefringent crystal. However, according to the following embodiments of the present invention, the polarization dependence loss can be reduced.

FIGS. 26(A) and 26(B) are a top view and a side view, respectively, of a variable optical attenuator according to an embodiment of the present invention. More specifically, FIGS. 26(A) and 26(B) illustrate a bias magnetic field 154, which is not provided in the variable optical attenuator illustrated in FIG. 30, for integrating the magnetic domains in a Faraday element 150. Bias magnetic field 154 is applied to Faraday element 150 in a direction perpendicular to the light beam. A magnet 152 for producing bias magnetic field 154 is illustrated in FIG. 26(A) and omitted in FIG. 26(B). In practice, a magnetic field parallel with the light beam is also applied to Faraday element 150 so as to produce the Faraday rotation. To simplify the description, the magnetic field parallel with the light beam is not shown in the FIGS. 24(A) and 24(B). The remaining components of the variable optical attenuator illustrated in FIGS. 26(A) and 26(B) are the same as those of the variable optical attenuator illustrated in FIG. 30.

In the variable optical attenuator illustrated in FIGS. 26(A) and 26(B), the light beam is subject to birefringence by birefringent crystal 8a and converted into a light beam containing an ordinary ray 156 and an extraordinary ray 158 which are characterized by different refractive angles. Ordinary ray 156 and extraordinary ray 158 are subject to bias magnetic field 154 by Faraday element 150. Bias magnetic field 154 is applied in a direction perpendicular to a plane (referred to as a refractive interface) formed by ordinary ray 156 and extraordinary ray 158.

Figure 27A:
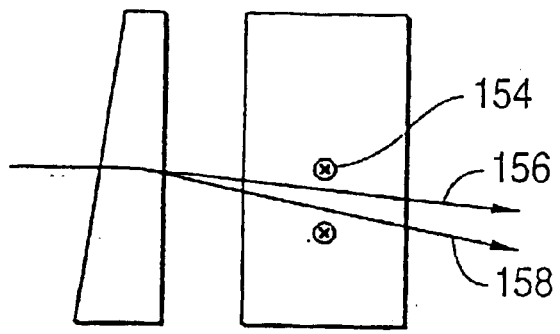
FIGS. 27(A) and 27(B) are diagrams illustrating patterns of directions of a bias magnetic field of a variable optical attenuator, according to an embodiment of the present invention.
Figure 27B:
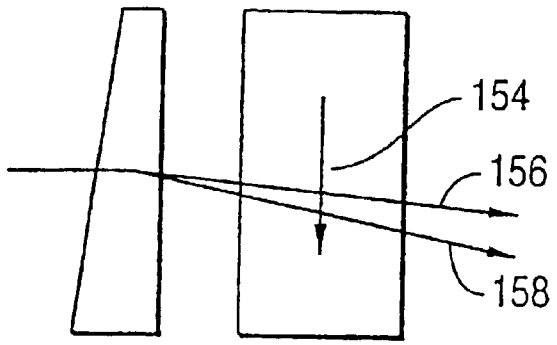
Figure 28:
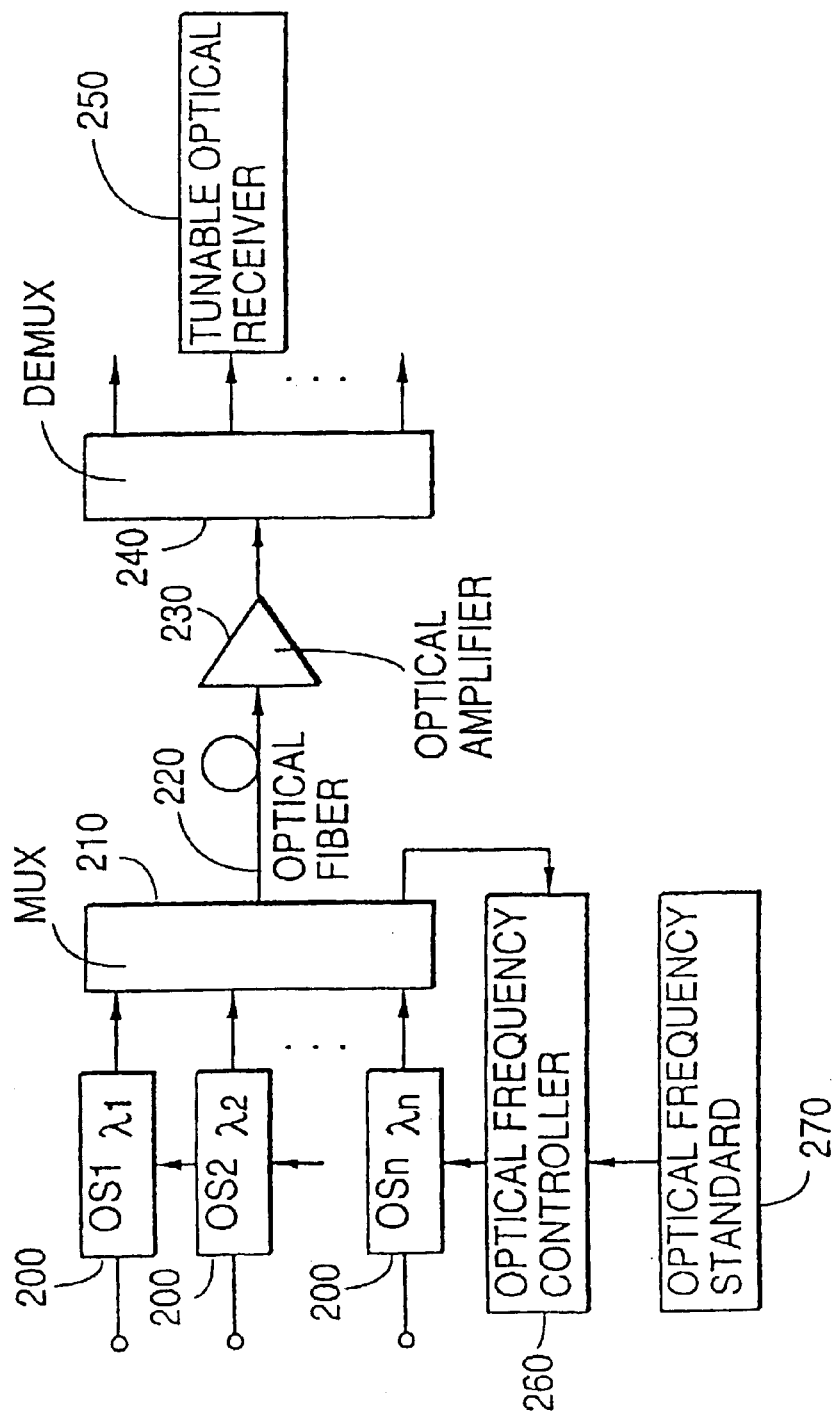
FIG. 28 (prior art) is a diagram illustrating a conventional optical communication system which uses wavelength division multiplexing.

FIGS. 27(A) and 27(B) are diagrams illustrating patterns of directions of bias magnetic field 154 of the variable optical attenuator illustrated in FIGS. 26(A) and 26(B), according to an embodiment of the present invention. FIG. 27(A) shows a case where bias magnetic field 154 is applied in a direction perpendicular to a refractive interface, and FIG. 27(B) shows a case where bias magnetic field 154 is applied parallel with the refractive interface. Therefore, both ordinary ray 156 and extraordinary ray 158 are subject to the same strength of bias magnetic field 154.

As illustrated in FIG. 27(B), bias magnetic field 154 may be applied in a direction parallel with the refractive interface of the bias magnetic field. However, bias magnetic field 154 is applied in a direction substantially perpendicular to the light beam. Since ordinary ray 156 and extraordinary ray 158 have different refractive angles, bias magnetic fields having different strengths are applied to the rays. This difference in the strengths of the magnetic fields applied is thought to cause a polarization dependent loss.

By applying a bias magnetic field substantially perpendicular to the refractive interface, as illustrated in FIG. 27(A), the polarization dependent loss can be reduced.

In a variable optical attenuator according to above embodiments of the present invention, two magnetic circuits are used to control the attenuation. For example, an electromagnet forms one magnetic circuit, and a permanent magnet forms a second magnetic circuit. Hence, the magnetic field of the magnetic circuits may leak outside the variable optical attenuator. Particularly, the magnetic field of the permanent magnet is so strong that it has an extensive effect outside the variable optical attenuator. Effective measures to reduce this effect include providing a yoke, similar to the yoke of the electromagnet, in the permanent magnet, or providing a magnetic shield for the housing.

In a variable optical attenuator according to various embodiments of the present invention as described above, a magnetic field, or a portion thereof, produced by a permanent magnet is applied to a magnetooptical crystal in a direction parallel with a light beam travelling therethrough. As a result, even if a current to be applied to an electromagnet is cut off, the light beam can be transmitted.

In a variable optical attenuator according to various embodiments of the present invention as described above, a magnetooptical crystal (Faraday element) is tightly fitted in a gap provided in a yoke. Thus, the magnetic field produced in the yoke is efficiently supplied to the magnetooptical crystal without any leakage occurring. As a result, a uniform strong magnetic field is applied to the magnetooptical crystal. As compared to a construction in which there is a gap between the magnetooptical crystal and the yoke, a current to be supplied to the magnetic circuit is reduced so that the driving power of the magnetic circuit is reduced.

In a variable optical attenuator according to various embodiments of the present invention as described above, an effect caused by a magnetic resistance in a yoke is prevented by providing a coil in the neighborhood of the magnetooptical crystal. In this way, the magnetic field produced in the yoke can be efficiently supplied to the magnetooptical crystal. Accordingly, the driving power of a magnetic circuit is reduced. Moreover, since the height of a loop formed by the yoke is reduced, the height of the variable optical attenuator is reduced so that the mounting of components in the attenuator becomes easy.

In a variable optical attenuator according to various embodiments of the present invention as described above, a gap in a yoke can be narrowed to about 200 µm. Therefore, the magnetic field produced in the yoke is efficiently applied to a Faraday element to thereby reduce required driving power.

With an optical amplifier used with a variable optical attenuator according to various embodiments of the present invention as described above, the wavelength dependence of the attenuation of the variable optical attenuator is arbitrary set by adjusting the polarization direction of an analyzer, the polarization direction of the light signal and characteristics (such as the length) of a magnetooptical crystal. Accordingly, the wavelength dependence of the optical amplifier can be reduced without using an optical filter for equalizing the gain.

Moreover, the variable optical attenuator can be configured to have a greater wavelength dependence with an increase of the attenuation. Therefore, the wavelength dependence of the gain of the optical amplifier can be successfully canceled when the upper limit of the pump power is small. Accordingly, pump power for the optical amplifier can be set to a small level so that the optical amplifier has a relatively small size and consumes a relatively small amount of power.

With an optical amplifier used with a variable optical attenuator according to various embodiments of the present invention as described above, the output power of the variable optical attenuator is monitored by an output photoreceptor and controlled to be maintained at a predetermined level. Also, the input power of a light beam is monitored by an input photoreceptor. The ratio between the power of the light beam monitored by the input photoreceptor and the output power of the variable optical attenuator monitored by the output photoreceptor can be controlled to be a predetermined value. Therefore, the temperature dependence, the time-dependent degradation, and the variation in polarization dependent loss of the variable optical attenuator can be compensated.

In a variable optical attenuator according to various embodiments of the present invention as described above, a space only large enough to house the radius of a ring-shaped yoke is necessary above and below a light beam transmitted through the variable optical attenuator. In this way, the height of the variable optical attenuator can be reduced.

In a variable optical attenuator according to various embodiments of the present invention as described above, the magnetic field produced in an electromagnet can be stably controlled in grades by individually driving a plurality of semi-hard magnetic materials characterized by different magnetization performance.

In a variable optical attenuator according to various embodiments of the present invention as described above, a polarization rotation unit receives a light signal polarized in a first direction, and rotates the polarization of a light signal to produce a polarization rotated light signal having a polarization component in a second direction which is, for example, 80 degrees ±30 degrees with respect to the first direction. Preferably, the second direction is 90 degrees with respect to the first direction. An output unit passes the polarization component in the second direction of the polarization rotated light signal and blocks the polarization component in the first direction.

A mirror could be placed in the light path of the polarization rotated light signal, before the polarization rotated light signal is received by the output unit. This mirror will change the polarization direction of the polarization rotated light signal. However, in this case, the polarization rotation unit still should be considered to rotate the polarization of a light signal to produce a polarization rotated light signal having a polarization component in a second direction which is 80 degrees ±30 degrees with respect to the first direction. In other words, the second direction is determined at the output of the polarization rotation unit, before any mirrors or other such devices are used to further rotate the polarization. Therefore, the output unit would pass components in the second direction, as determined at the output of the polarization rotation unit. Placing mirrors in the optical path should not be considered to change this relationship between the first and second directions, or between the output unit and the polarization rotation unit.

Moreover, in a variable optical attenuator according to the above embodiments of the present invention, an offset device could be included between a polarization rotation unit and an output unit. The offset device could add a fixed rotation offset to a polarization rotated light signal output from the polarization rotation unit. In this case, the output unit should be considered to include the offset device. Therefore, placing an offset device between the polarization rotation unit and the output unit should not be considered to change the relationship between the first and second direction, or between the output unit and the polarization rotation unit.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus comprising:

an optical amplifier amplifying a light and having a wavelength dependent gain;

an optical filter filtering the light; and an optical attenuator attenuating the light, the optical attenuator having a wavelength dependent attenuation, wherein wavelength dependent loss characteristics of the optical filter and the optical attenuator are determined in accordance with the wavelength dependent gain of the optical amplifier.

* * * * *

UNITED STATES PATENT AND TRADEMARK OFFICE
CERTIFICATE OF CORRECTION

PATENT NO. : 6,717,713 B2
DATED : April 6, 2004
INVENTOR(S) : Hiroshi Onaka et al.

It is certified that error appears in the above-identified patent and that said Letters Patent is hereby corrected as shown below:

Title page,
Item [56], References Cited, OTHER PUBLICATIONS,
"U.S. patent application Ser. No. 08/803,378" reference, after "filed" insert -- February 20, 1997 --.
"U.S. patent application Ser. No. 08/655,027" reference, after "May 28," insert -- 1996 --.
"U.s. patent application Ser. No. 09/921,692" reference, change "U.s." to -- U.S. --.
Item [57], ABSTRACT,
Line 20, change "he" to -- the --.

Signed and Sealed this

Twenty-second Day of February, 2005

JON W. DUDAS
*Director of the United States Patent and Trademark Office*